US007211726B2

(12) United States Patent  (10) Patent No.: US 7,211,726 B2
Bally et al.  (45) Date of Patent: May 1, 2007

(54) OPEN MEDICAL SYSTEM

(75) Inventors: Alexander Bally, Barrington, RI (US);
Gary M. Schindele, Montverde, FL (US); Tomio Kato, Norcross, GA (US);
John P. Kasten, Lithia, FL (US)

(73) Assignee: Lifespan Healthcare, LLC, Tampa, FL (US)

( * ) Notice: Subject to any disclaimer, the term of this patent is extended or adjusted under 35 U.S.C. 154(b) by 384 days.

(21) Appl. No.: 10/212,395

(22) Filed: Aug. 5, 2002

(65) Prior Publication Data
US 2004/0020675 A1    Feb. 5, 2004

(51) Int. Cl.
*H01H 9/02* (2006.01)
(52) U.S. Cl. .................. 174/53; 174/48; 52/28
(58) Field of Classification Search .......... 174/53, 174/48; 52/28
See application file for complete search history.

(56) References Cited

U.S. PATENT DOCUMENTS

| | | | |
|---|---|---|---|
| 3,032,057 A | 5/1962 | Mays | |
| 3,660,591 A | 5/1972 | Schultz | |
| 3,762,398 A | 10/1973 | Schefke et al. | |
| 3,769,502 A * | 10/1973 | Schultz et al. | 362/85 |
| 3,921,345 A | 11/1975 | Damico | |
| 3,991,264 A * | 11/1976 | Connell | 174/38 |
| 4,104,710 A * | 8/1978 | Damico et al. | 362/130 |
| D251,855 S | 5/1979 | Schindele | |
| D252,070 S | 6/1979 | Schindele | |
| D261,804 S | 11/1981 | Foster et al. | |
| 4,354,330 A * | 10/1982 | Schwartz | 52/28 |
| 4,475,322 A * | 10/1984 | Russo et al. | 52/27 |
| 4,498,693 A | 2/1985 | Schindele | |
| 4,807,659 A | 2/1989 | Schindele | |
| 4,821,470 A | 4/1989 | Kappers | |
| 4,869,378 A | 9/1989 | Miller | |
| 4,905,433 A | 3/1990 | Miller | |

(Continued)

OTHER PUBLICATIONS

Modular Services Co., Oklahoma City, OK 73105 Brochure/catalog titled: "Modular™ Columns", 8 pages, 1995.

(Continued)

*Primary Examiner*—Dhiru R. Patel
(74) *Attorney, Agent, or Firm*—Barlow, Josephs & Holmes, Ltd.

(57) ABSTRACT

An open medical system for deploying, supporting and organizing medical equipment and medical utilities comprising a utility connection, and a main assembly having an upper plate and lower plate held in fixed spaced apart relation by a plurality of spacers, at least one core located between the upper plate and lower plate, with each core having at least one utility supply line and one outlet. An open space bounded by the upper and lower plates and the inner surfaces of the cores is free of utility outlets. Equipment rails are connected between the spacers to support medical equipment.

The utility connection can be a ceiling tube or a base assembly, permitting the supplying of utilities from above or below the main assembly. Alternatively, the system can be supported by a support which can be a base assembly and can rotate. A rotating base assembly can be used to restrict rotation, and several alternative means can provide indexed rotation. Alternatively, the support can be provided from above the main assembly by a fixed support, or a moving articulating arm, or from both above and below.

33 Claims, 18 Drawing Sheets

U.S. PATENT DOCUMENTS

| | | | |
|---|---|---|---|
| 4,907,767 A | | 3/1990 | Corsi |
| 4,942,271 A | | 7/1990 | Corsi |
| 5,072,906 A | | 12/1991 | Foster |
| 5,077,843 A | | 1/1992 | Foster |
| 5,107,636 A | * | 4/1992 | Schindele et al. ............. 52/27 |
| 5,186,337 A | | 2/1993 | Foster |
| 5,247,962 A | | 9/1993 | Walker |
| 5,284,255 A | | 2/1994 | Foster |
| 5,299,338 A | | 4/1994 | Foster |
| 5,398,359 A | | 3/1995 | Foster |
| 5,490,652 A | | 2/1996 | Martin |
| 5,515,659 A | * | 5/1996 | MacDonald et al. .......... 52/474 |
| 5,553,892 A | | 9/1996 | Pitchford |
| 5,618,090 A | | 4/1997 | Montague |
| 5,756,933 A | | 5/1998 | Pitchford |
| 5,878,536 A | | 3/1999 | Demmitt |
| 5,890,326 A | | 4/1999 | Gallant |
| 5,907,592 A | * | 5/1999 | Levinson ....................... 378/4 |
| 5,921,795 A | | 7/1999 | Weener |
| D418,603 S | | 1/2000 | Gallant |
| 6,084,180 A | | 7/2000 | DeBartolo, Jr. |
| 6,095,468 A | | 8/2000 | Chirico |
| 6,096,025 A | | 8/2000 | Borders |
| 6,196,649 B1 | | 3/2001 | Block |
| 6,213,481 B1 | | 4/2001 | Marchese |
| 6,256,935 B1 | | 7/2001 | Walker |
| 6,269,594 B1 | | 8/2001 | Walker |
| 6,311,440 B1 | | 11/2001 | Feldpausch |
| 6,360,389 B1 | | 3/2002 | Gallant |
| 6,495,895 B1 | * | 12/2002 | Peterson et al. ............ 257/434 |

OTHER PUBLICATIONS

MEDEAS Medical Architectural & Engineered Systems; Norcross, GA Brochure/ Catalog titled: "Moveable Critical Care Column" 6 pages, No Date.

MEDEAS Medical Architectural & Engineered Systems; Norcross, GA Brochure/ Catalog titled: "Moveable Critical Care Column Architectural Specifications", 7 pages, 1995, Rev. Mar. 1996, No Date.

MEDEAS Medical Architectural & Engineered Systems; Norcross, GA Brochure/ Catalog titled: "Moveable Critical Care Column Technical Data Sheet," 9 pages 1995, Rev. Mar. 1996.

Modular Services Co., Oklahoma City, OK 73105 Drawing titled: "Open Access Dual Tower Model 5702; PR 5702 (May 6, 1996)" 1 sheet.

Modular Services Co., Oklahoma City, OK 73105 Drawing titled: "Rectangular col. 5502; PR 5502 (May 8, 1996)" 1 sheet.

Modular Services Co., Oklahoma City, OK 73105 Drawing titled: "Multi-Dimensional™ col. 5503 PR5503 (May 8, 1996)"; 1 sheet.

Modular Services Co., Oklahoma City, OK 73105 Drawing titled: "Multi-Dimensional™ col. 5504 PR5504 (May 8, 1996)"; 1 sheet.

Modular Services Co., Oklahoma City, OK 73105 Drawing titled: "Ceiling Cloumn 5601 PR5601 (May 8, 1996)" ;1 sheet.

* cited by examiner

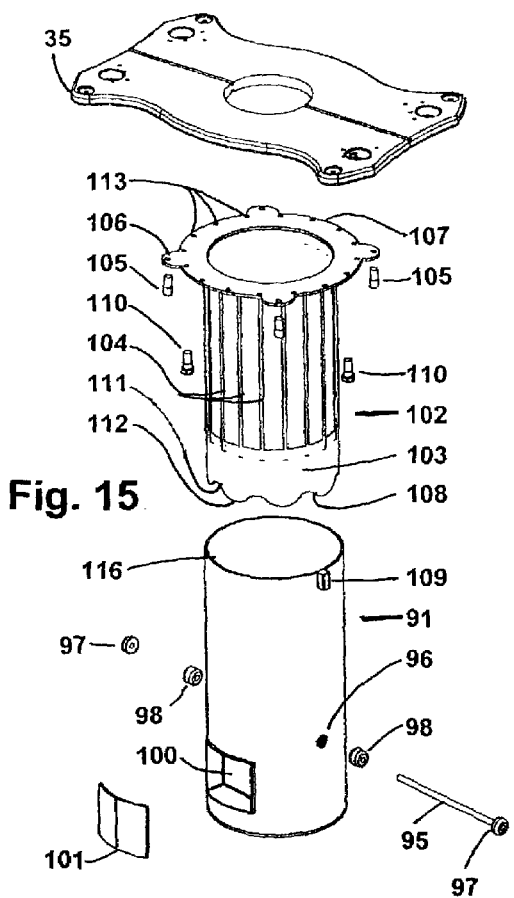
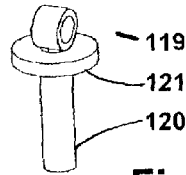
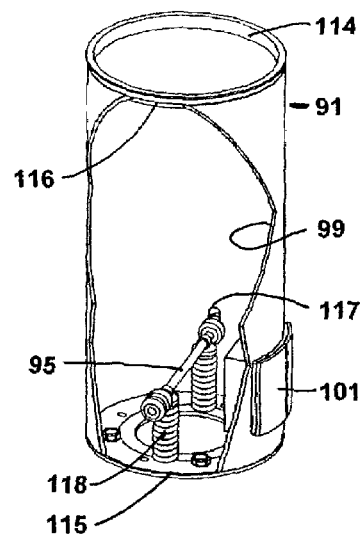
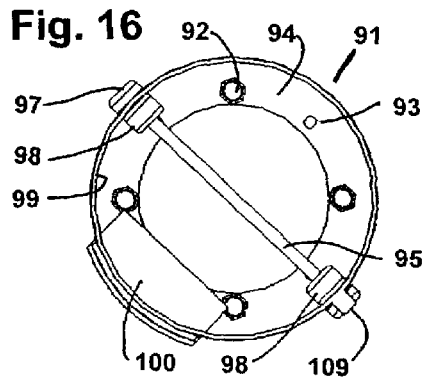
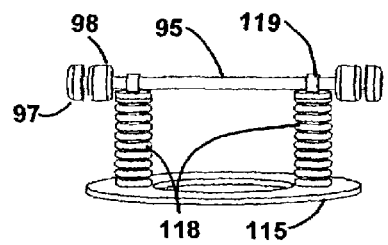

OPEN MEDICAL SYSTEM

BACKGROUND

This invention concerns systems for deploying, supporting and organizing medical equipment and essential medical utilities at a patient's bedside.

Medical treatment facilities deploy numerous and diverse bedside medical devices in support of seriously ill or injured patients. Many of these devices are connected to hospital utilities through wall outlets that deliver, for example, oxygen, suction, compressed air, electric power, including standard and emergency power, low voltage electricity, nurse call lines, computer network connections, communications wiring, lighting, and similar utilities used in administering medical services at high levels of care.

Typical devices deployed bedside support therapies, diagnostics, monitoring, emergency intervention and communications. These include infusion pumps, blood warmers, oxygen catheters, suctioning devices, air/oxygen blenders, gas flow meters, sphygmomanometers, monitors for ECG, heart rate and blood pressure, emergency call buttons, nurse intercoms, telephones, computer terminals, and other devices. In addition, there is a corollary need for specialized storage, such as sharps containers, surgical gloves, catheters, and other items used in intensive patient care.

The devices and storage items used in intensive care are typically gathered into systems for their deployment, support and organization. Traditionally, such systems include headwall systems in both vertical and horizontal designs installed behind the patient bed to deliver hospital utilities such as gases, power, and communications through outlets located behind the head of the patient bed and flat against the wall. Headwall systems are expedient for routing utilities through walls, but they impede free access by care givers to both the patient's head and to the support equipment and utility outlets. Headwall systems are depicted in U.S. Pat. Nos. 5,553,982 and 5,756,933.

More recently, medical support equipment has been moved from the wall behind a patient's head and consolidated in cabinet-like structures placed next to the bed near a patient's head to conserve useable floor space, improve circulation in the room and provide access to the patient's head. These support systems include free standing systems with generally rectangular footprints, systems entirely suspended from articulated ceiling arms, and systems that are supported both from floor and ceiling, such as those depicted in U.S. Pat. Nos. 5,107,636 and 5,618,690. Utility outlets in such systems generally are presented to care givers in horizontal strips, with the devices or equipment attached externally to the system.

Treatment facilities for the intensive care of critically ill patients, such as medical, cardiac or neonatal intensive care units, are extremely stressful environments for care givers and patients. Increasing emphasis is being given to humanizing this environment by toning down the sight and sounds of complex equipment and, when possible, incorporating the attendance and psychological support of members of patients' families in the healing process of the critically ill. Not surprisingly, the presence of family members is placing new emphasis on reducing visual clutter and noise levels in the layout and design of equipment at the patient's bedside. Existing support equipment is too overbearing, and the environment is too impersonal, noisy and frightening to make patients and family members feel at ease. Furthermore, the presence of family members makes circulation around beds, equipment and people much more difficult for the care giving staff. Presently available headwall system and free-standing or ceiling supported systems are inadequate for these new requirements. Specifically, present systems exemplified by U.S. Pat. No. 5,107,636, are large, bulky, angular and not user friendly because they expose the equipment they organize to the environment on all sides. Equipment generally is attached in such systems by means of straight, horizontal equipment rails positioned near the periphery of the main enclosure so the equipment projects beyond the systems' perimeter, significantly increasing the operational footprint of the system. Additionally, equipment attached externally to these systems in this manner is even more visually overwhelming and a hazard to the circulating staff.

Interpersonal communications among staff require visual and auditory contact across the room. Existing systems, exemplified by U.S. Pat. Nos. 5,107,636 and 5,618,690, provide open viewing passages through their interior space. These open areas, however, usually are traversed by many permanent structural elements and supports for equipment and outlets that effectively reduce this openness. Because of the permanent nature of such traversing structures and elements, the care giving staff has limited freedom in arranging these systems and can not always place equipment to achieve best productivity. If equipment is attached to such systems' equipment rails so it projects inward rather than out, the controls of these devices face inward away from the user, and access to them is further obstructed by the rail and mounting clamps.

It is crucial to reduce opportunities for error on the part of care givers, particularly under the stress of intensive patient care. In known systems, equipment is arranged based on a horizontal organizing principle, which may make it difficult to clearly distinguish equipment belonging to particular groupings such as a patient on the left or right side, or to a particular therapeutic procedure. This may increase the risk of error.

Furthermore, when outlets are contained in known horizontal raceways and strips, such as shown in U.S. Pat. Nos. 5,107,636 and 5,618,690, outward-facing electrical plugs, hanging cables and hanging hoses create a curtain that obstructs and obscures user access to the open area on the systems' interior. Typically, certain devices including flow meters and blenders are plugged directly into the gas outlets positioned in the outlet strips. When these devices project outward beyond the systems' footprint, they are exposed and vulnerable.

Infection control is another important issue in intensive patient care facilities. Present systems impede cleaning and the control of dust because they incorporate many permanent, horizontal frames, bars, channels, and structures where horizontal and cross members meet. Crevices at these joints can accumulate dust and are difficult to clean. Also, casters and wheels impede efficient floor cleaning, and top surfaces above eye level are typically not slanted for easy wiping access.

Cost is an essential issue in health care. Capital outlays for known systems are significant because these systems are large, heavy, complex, and do not offer the flexibility to be configured and reconfigured to support different levels of care and other applications. Installing known systems is costly when they require expensive articulated structures to connect them to the ceiling, or when they do not have a detachable floor mounting base or wall mounting bracket that enable rough-in installation without the entire, fully-assembled system being installed. Maintaining known systems can be costly because it is not easy to gain open access to the service side of all outlets and cable ways for replacement of outlets or to add a new circuit.

Moreover, productivity and work flow inefficiencies present other additional costs when known systems do not allow a facility or an individual care giver the freedom to arrange a work space as desired. Known systems do not allow easy upgrading, additions, modifications or re-deployment when other, greater or lesser levels of care are required.

Adjustability of systems is desirable to allow staff to position equipment where needed. Many known systems cannot be adjusted, provide no toe space for the user, and require an unsightly, laterally attached wiring chase extending to the ceiling. Other known systems are moveable, but require an elaborate, costly and visually imposing articulated structure to conduct utility lines from the ceiling, and a wheeled base that creates cleaning problems.

For the foregoing reasons, there is a need for a low cost, modular and versatile medical equipment and utilities system that contains support equipment and storage items associated with patient care within its perimeter, permits care givers to arrange equipment easily and quickly to support individual working styles, and allows equipment to be easily and meaningfully grouped and regrouped. There is a need for a system that conceals all utility cables and hoses, presents utility outlets at a user-friendly angle, and provides a means for attaching accessories that enable patient's families to personalize the bedside, permits easy access for on-site service, repair and expansion, and can be rapidly installed with minimum disruption of an existing facility.

SUMMARY

The present invention is directed to a system that satisfies the above described needs. The system comprises upper and lower horizontal plates held in fixed spaced apart relation by a plurality of spacers, and vertical utility cores with vertical outlet strips, located between the plates to leave an open space in the center portion of the system. The system is held at operating level by a base or ceiling support, and optionally can be made to rotate for easy adjustment. Equipment mounting rails can be clamped to the spacers internally in such a way that equipment and storage items attached to the rails are held within the footprint of the system, and can be easily arranged and re-arranged by the users as desired.

The system is configured from longitudinal, preferably extruded, vertical elements that allow the system to be scaled to any desired height. The vertical utility cores are comprised of base modules that increase ease of use and configurational flexibility. Optionally, modular panels can be installed by a user to divide the interior open space of the system into two separate alcoves for privacy, and to help absorb sound. Optional modular accessories can be attached to the system's vertical side panels to allow users and patients' families to humanize and personalize their environment.

Utility channels that house outlets are vertical and present outlets to the user at a user-friendly angle. A contoured cap facilitates infection control by keeping dust off the upper plate, and also serves as a distribution duct for ceiling-supplied utility service lines. Auxiliary transoms may also serve to route lines to and between cores. Contoured equipment rails, and clamps that attach them to the vertical spacers, allow attachments of numerous medical devices and storage items clipped to the rails within the system's footprint. These elements permit care givers to arrange all equipment easily and quickly to support their individual working styles.

Attachment of the system to a recessed base provides toe space for the user and, in combination with a thin ceiling tube that conceals utility lines, the system presents a slender, non-imposing element in an equipment-intensive patient care facility. The distinctive vertical orientation of the two laterally arranged utility cores and its resulting left-right symmetry enables the care givers to identify each side of the system with a particular patient, while minimizing errors in associating equipment to the correct patient. Front-to-back symmetry has similar benefits and enables the system to be used as a partition between, for example, adjoining incubators.

Because the system is constructed from few, simple parts and features a simple rotating and indexing device, it can be manufactured at low cost. The system can be rapidly and cost-effectively installed on a fixed or rotating base with minimum disruption to an existing facility because a separable rough-in portion of the base can be pre-installed by the contractor and the fully-assembled structure can be placed later to complete the installation when the job site is clean. Large access openings and large access panels on each side of the system simplify and speed field installation and enable rapid, unimpeded access to all wiring devices and internal components for low-cost service, repair and upgrading.

The system has alternative embodiments that deploy, support and organize medical equipment and storage items associated with critical patient care. The alternative embodiments of this system can accommodate different levels of care, as well as different mounting means, including wall-mounted systems, ceiling-mounted arms and posts, and free-standing systems.

This invention provides better care giver access to the utilities, while concealing connections, wires and hoses from the patient, and leaves space on the system's interior open to enhance visual and auditory communications between staff members, and to permit care givers to arrange and re-arrange equipment within the system. This is done, in part, by containing outlets within opposing cores of vertical orientation, with outlets facing toward the open interior of the system where support equipment is typically attached.

This invention accommodates equipment generally within the narrow footprint of the system, rather than having it extending out from the system, and improves movement around the column which helps improve response time of the staff during life saving intervention events.

Care givers can conveniently position and re-arrange equipment within the open area between the cores by using the contoured rails, rail mounting clamps and rail adapters.

The system's position can be adjusted relative to the patient by means of a low cost, user-friendly rotation mechanism located in the recessed support base for the system that also provides toe space for the user. The base can be split into two parts so that a rugged part of the base can be installed first to protect the rest of the system during construction. The base may be fitted with optional hospital utilities, such as dialysis connections.

Plenums located within the perimeter of the system rather than mounted externally on the end or side provide for easy connection of utility conduits and supply lines to the system, and for connection of the utilities to and between the cores of the system.

The system's modularization permits scalability to accommodate different sizes and numbers of medical equipment and utilities, and to permit easy installation of the system as a floor, ceiling or wall mounted system.

The cores and utility channels permit easy separation of utility types for regulatory approval of the system, and easy on-site expansion of the number of outlets, and enable free and rapid access to internal systems components for repair and installation of new circuits.

The number of joints lines and crevices between parts, as well as horizontal members, are reduced to facilitate infection control and to minimize the accumulation of dust.

DESCRIPTION OF THE DRAWINGS

These and other features and advantages of the invention are better understood with regard to the following description, claims and drawings, where:

FIG. 15 shows an exploded view of the rotating base assembly;

FIG. 16 shows a top view of outer base;

FIG. 17 shows a perspective cut-away view of an alternative rotating base assembly;

FIG. 18 shows a perspective view of an alternative indexing assembly;

FIG. 19 shows a perspective view of an axle guide bushing;

DESCRIPTION

Figure 1:
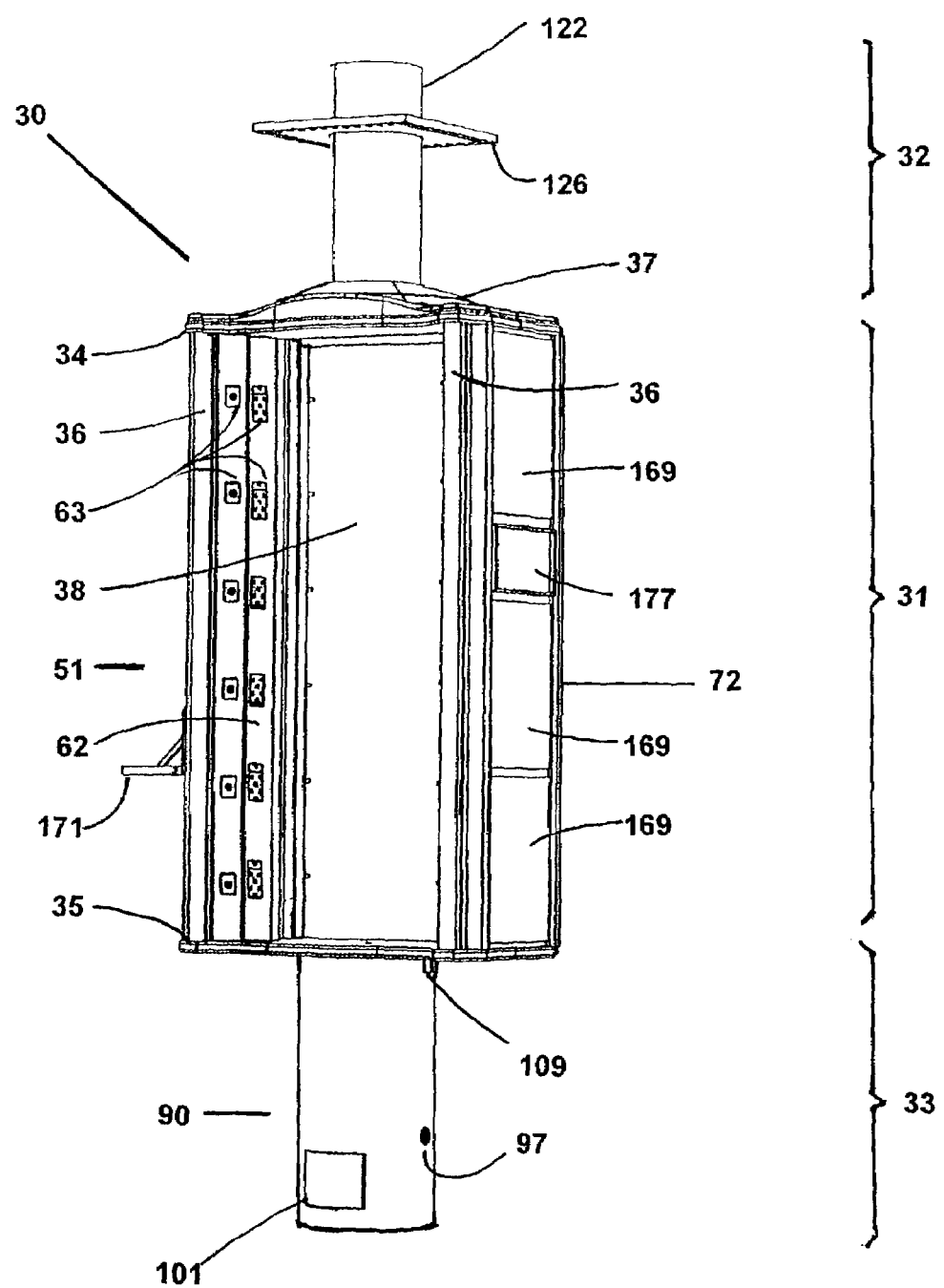
FIG. 1 shows an oblique elevational perspective view of the medical system.
Figure 2:
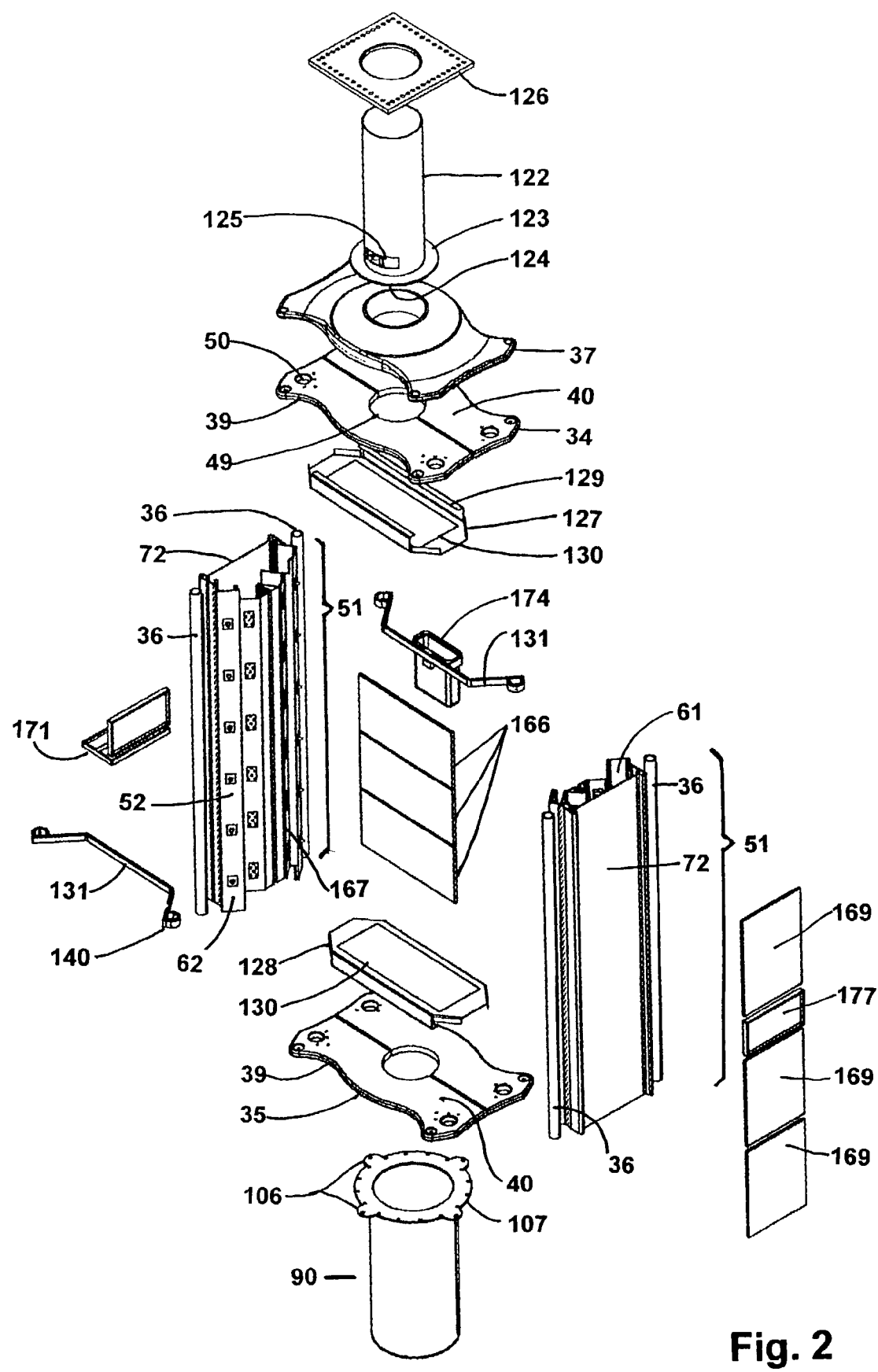
FIG. 2 shows an exploded view of the medical system.
Figure 8:
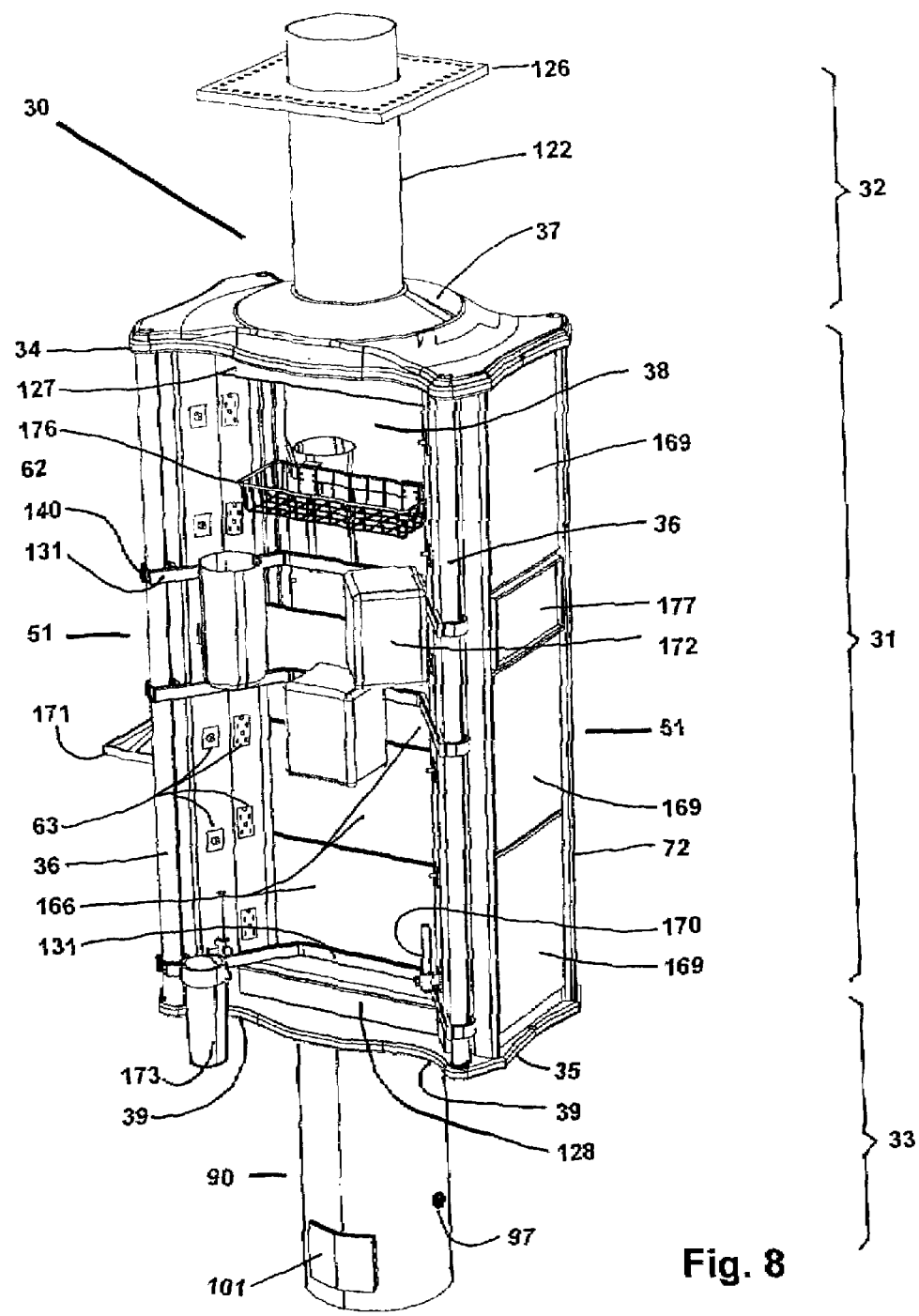
FIG. 8 shows an oblique elevational perspective view of the medical system with alternative utility supply line routing.
Figure 10:
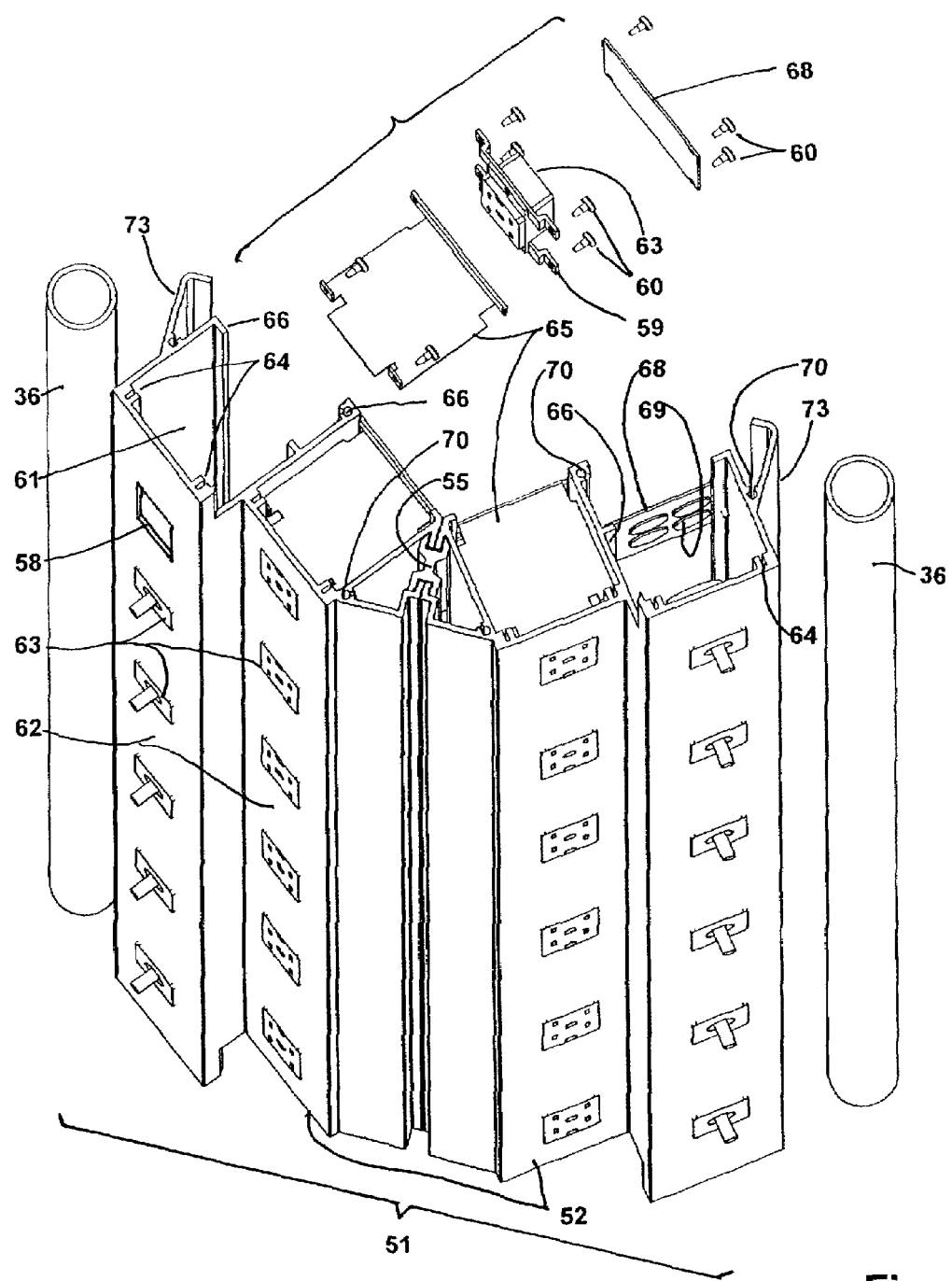
FIG. 10 shows an oblique view of a core showing installation of outlets and barriers.
Figure 20:
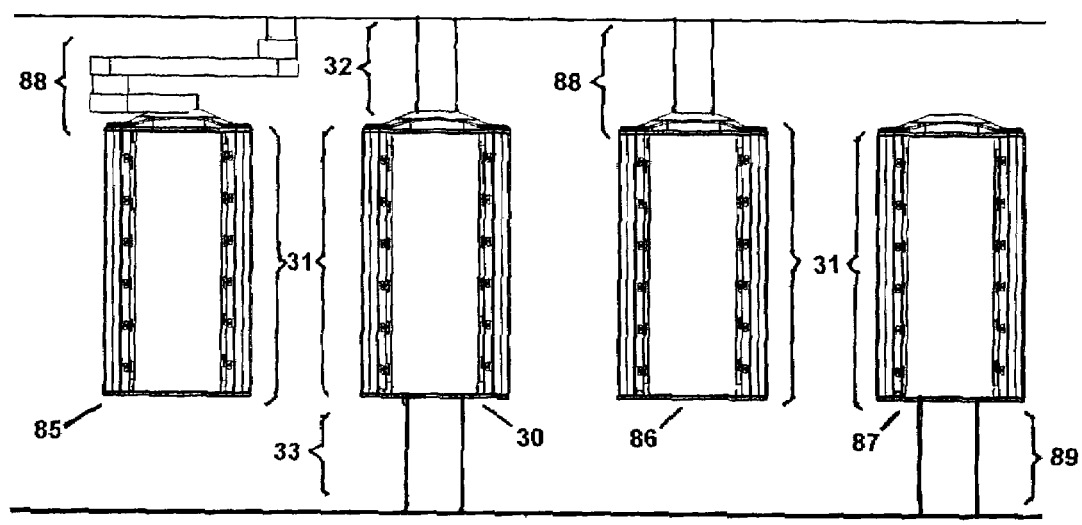
FIG. 20 shows alternative systems supports and utility connections.

As shown in FIGS. 1, 8 and 20, the open medical system 30 includes a main assembly 31, and a utility connection 32, and alternatively, a support 33. The main assembly 31 includes two plates, an upper plate 34 and a lower plate 35, the plates being substantially planar and oriented in a horizontal direction, which is traverse to the main, vertical axis of the system. The two horizontal plates 34, 35 are held in a fixed, spaced apart relation by vertical spacers 36. Also extending between the plates 34 and 35 are two elongated cores 51 of generally trapezoid cross section for containing the utility supply lines and outlets. The main assembly 31 is open and houses the cores 51 between the upper and lower plates 34, 35. As shown in FIGS. 1 and 10, an open space 38 is defined by the upper and lower plates, and the inner surfaces of the outlets 63 that protrude through openings 58 cut into the outlet surfaces 62 of the cores 51. In alternatives with transoms 127, 128, as shown in FIG. 2, the transom surfaces which have, or would have, covered access openings 130, rather than the upper plate and lower plate, define the upper and lower boundaries of the open space.

The open medical system 30 has a utility connection 32 for connecting utilities to the main assembly. As shown in FIGS. 1, 8 and 20, alternative embodiments may include a support 33, such as a base assembly 90. The system could be supported by means provided by others, such as directly on a floor, pedestal or other structure, as shown in FIG. 20.

In this embodiment, plates 34, 35 are milled from aluminum, one inch thick, and are approximately 32 by 18 inches in size, though different sizes could be used. The plates could be manufactured of any planar sheet material, including steel, stainless steel, wood and plastics, as well as machined, cast or molded, provided that the plates are strong enough to support the weight of equipment and utilities attached to the system, are rigid enough to prevent racking and excess deflection of the system, are easy to sanitize, and are fire resistant.

Figure 4:
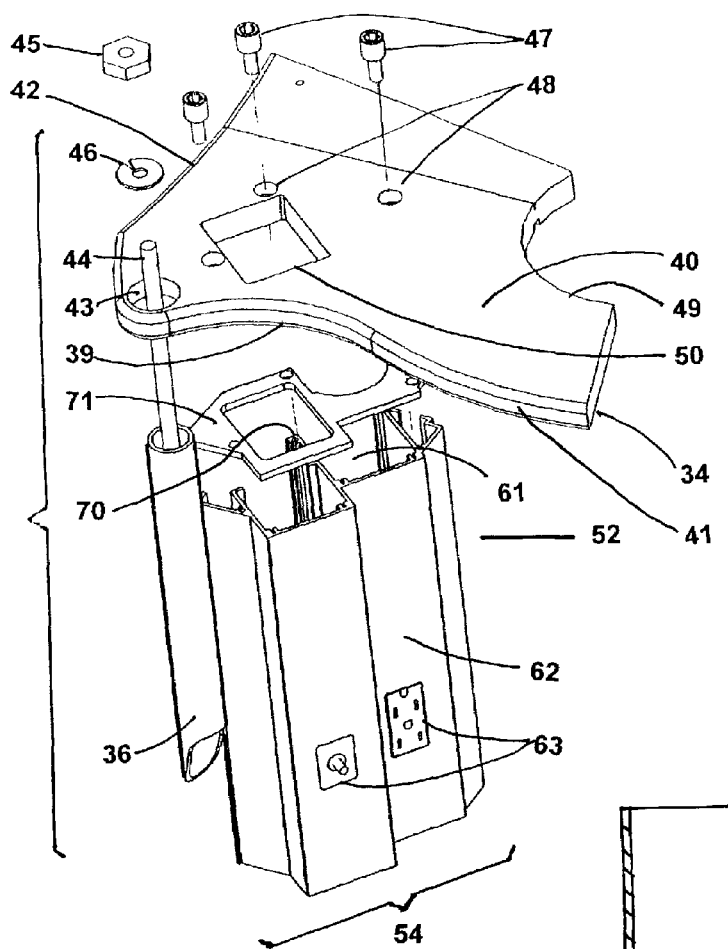
FIG. 4 shows an assembly of upper plate, vertical spacers and core.
Figure 7:
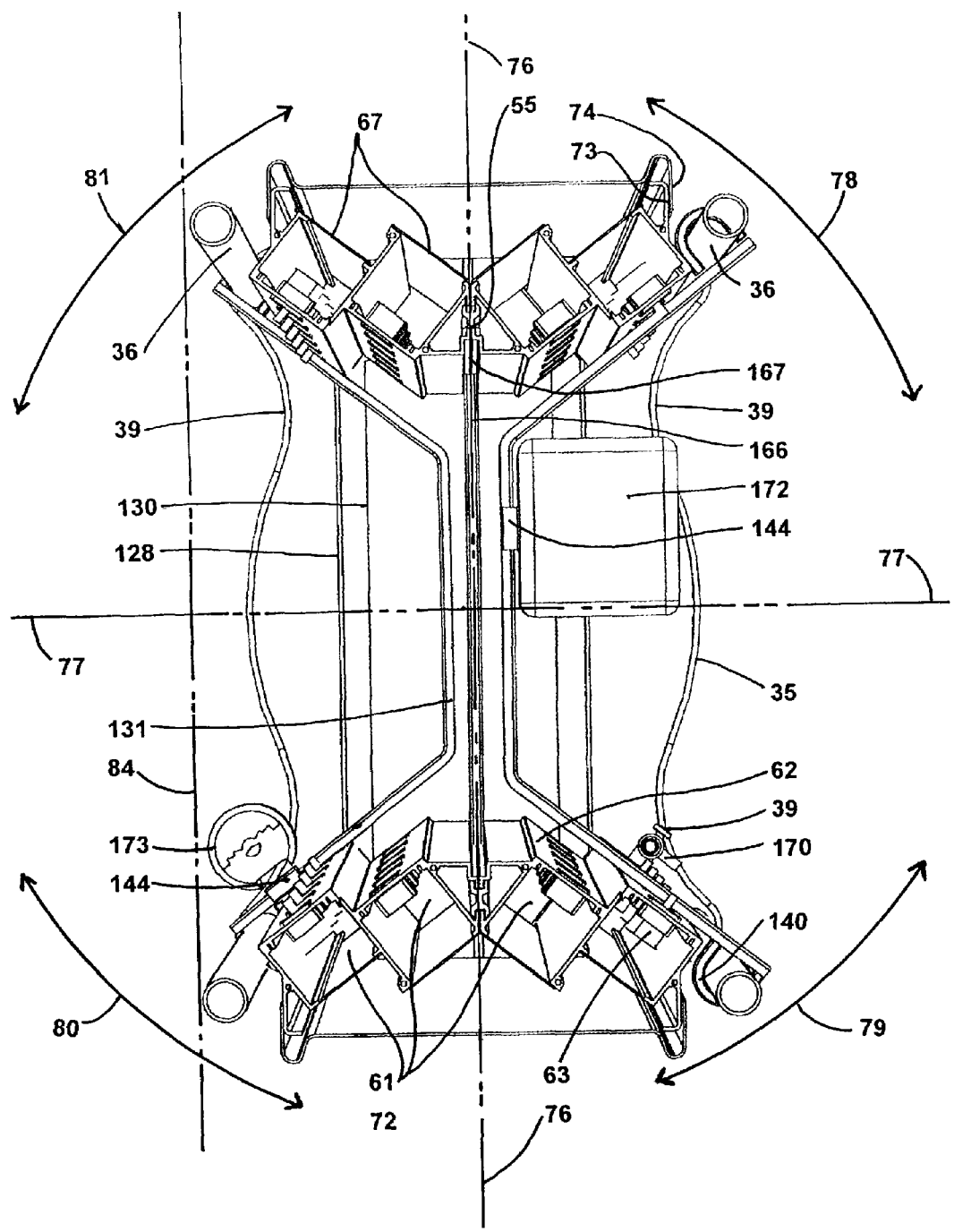
FIG. 7 shows a top-down perspective view into the system with ceiling tube, top panel, top cover and upper transom removed.

As shown in FIGS. 4 and 7, the upper and lower plates 34, 35 have two long edges 41 and two short edges 42. Where a long edge 41 adjoins a short edge 42, the long edge 41 has an indentation 39 that allows equipment, such as suction containers 173 that are attached to contoured equipment rails 131, to extend downward below the lower plate 35 and be protected within the footprint of the system 30.

The vertical spacers 36 in this embodiment are 1.5 inch diameter stainless steel tubes with sturdy walls, but could be of aluminum or other materials. As shown in FIG. 4 by a cutaway section of the upper plate 34, the vertical spacers 36 permit connection of the plates 34, 35 in this embodiment by means of threaded rods 44 extending through the spacers' interior lumen and tightening external nuts 45 onto lock washers 46 and against the upper and lower plates 34, 35 to create a stable, tensioned structure. Counter bores 43 recess the mounting nut and washer to be flush with the outer surfaces 40 of the plates 34, 35. Numerous methods of attachment of the vertical spacers 36 and plates 34, 35 could be used, including threaded bolts that compress the plates against the vertical spacers by engaging the threaded interior lumen of the tubes, threading the vertical spacers directly into tapped holes on the plates, or welding the vertical spacers to the horizontal plates.

Figure 3:
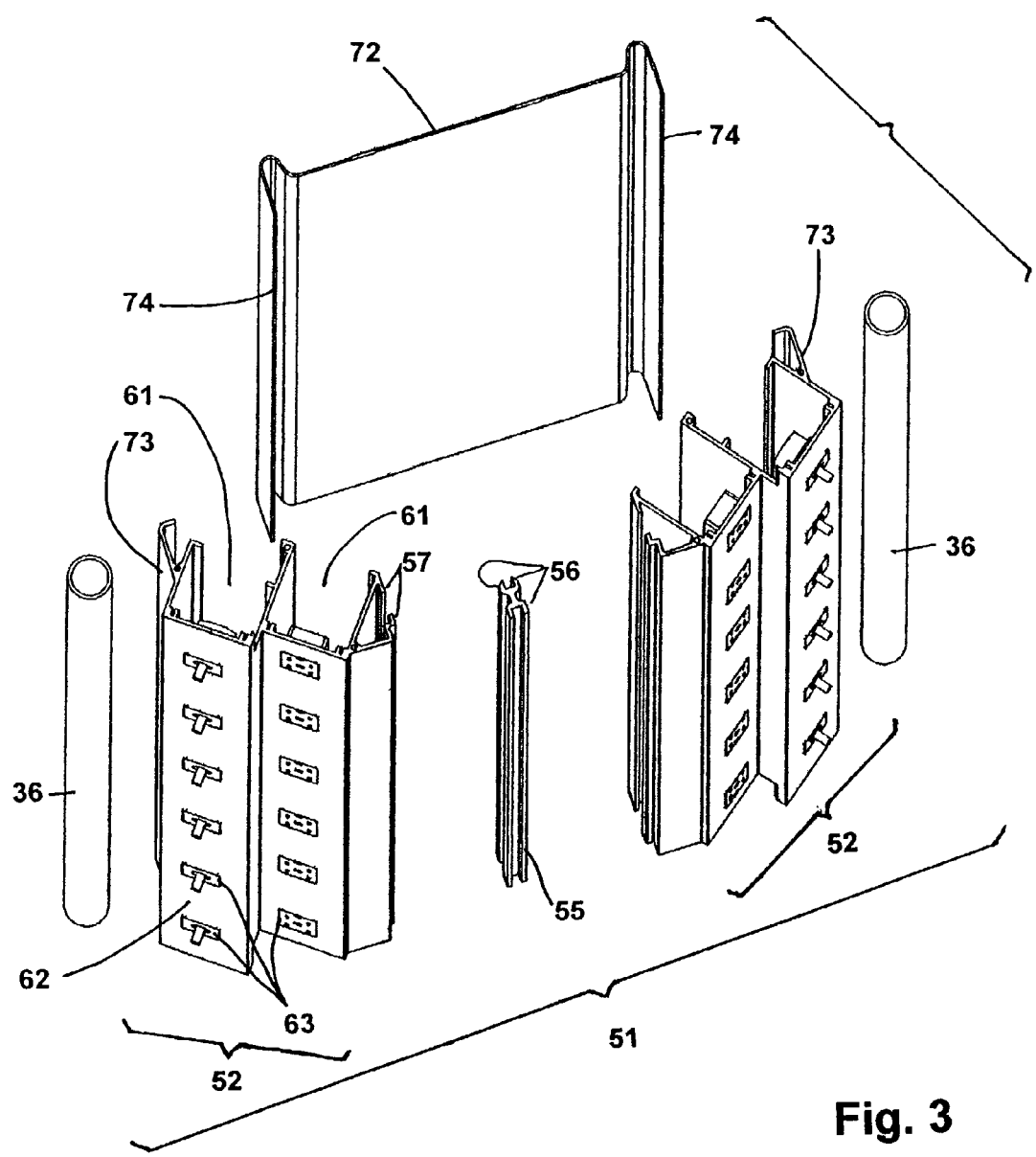
FIG. 3 shows an exploded view of a core with associated vertical spacers and side panel.

The open medical system alternative shown in FIGS. 1, 2 and 8 comprises two cores 51, each one located between a pair of vertical spacers 36. Each of the two trapezoidal cores 51 is made by joining two identical base modules 52, as shown in FIGS. 3, 7 and 10. The vertical orientation of outlet surfaces 62, and their disposition in four distinct vertical groupings corresponding to the four base modules 52, provides a clear separation and delineation of equipment and utility outlets in four distinct, recognizable and memorable zones. These zones are depicted in FIG. 7, in which the open medical system's two vertical axes of symmetry, front-to-back axis 76 and side-to-side axis 77, are shown. These zones help users of the system clearly designate each of the base modules 52 as pertaining to a side of the system, and to the front or back of the system. The four zones are indicated in FIG. 7 by arcs 78, 79, 80 and 81, and present four distinct groupings or banks of outlets.

Figure 6:
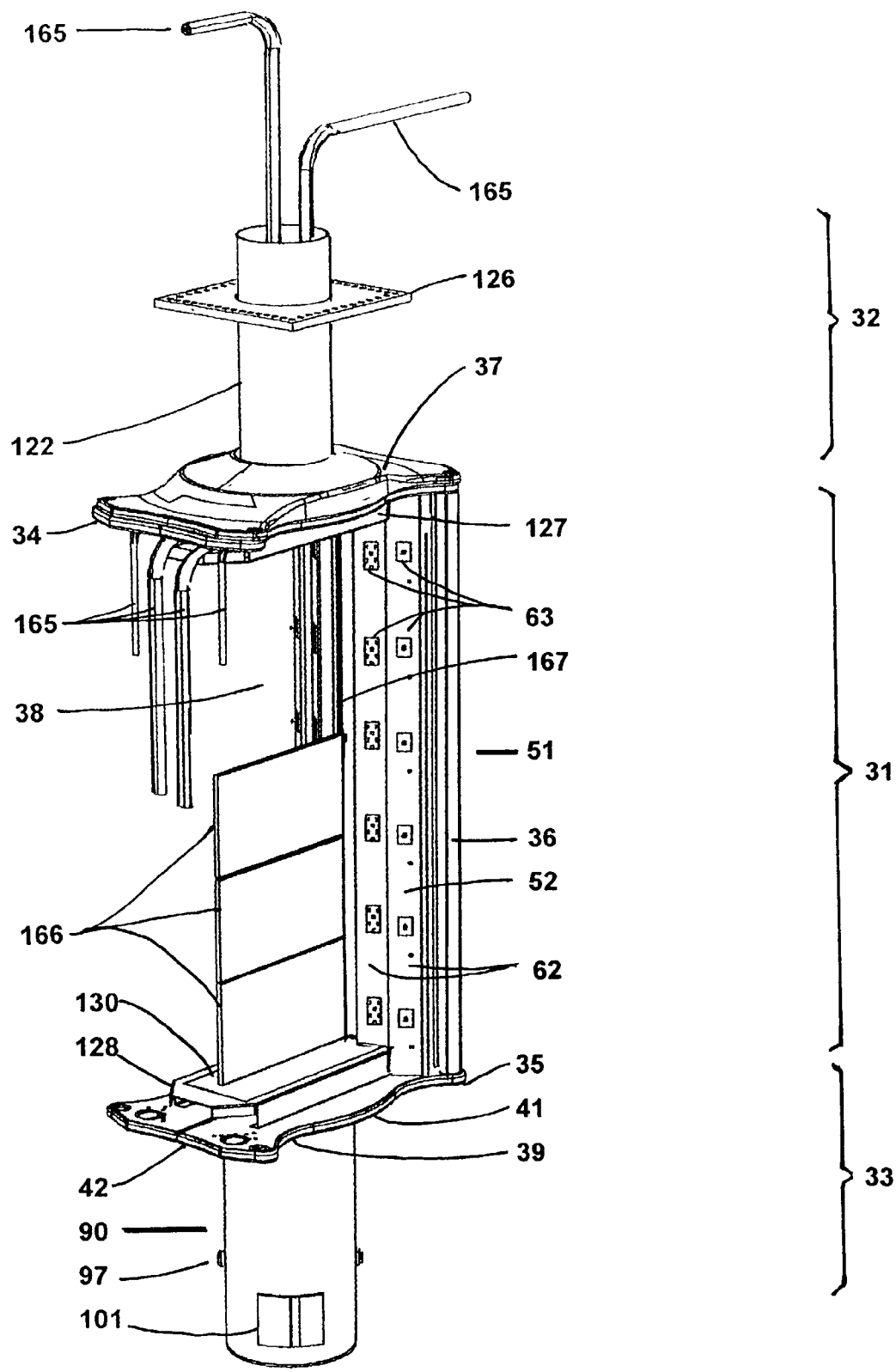
FIG. 6 shows an oblique side view facing a core with opposite core and vertical spacers removed.

When open medical systems are used in specialized care areas such as in neonatal intensive care units, it may be desirable to insert one or several partition modules 166 into central partition grooves 167 located in each core 51, as shown in FIG. 6. These partition modules help block the view between incubators, give mothers more privacy with their babies, and help isolate personal belongings, such as milk bottles, on one side of the system.

Figure 9:
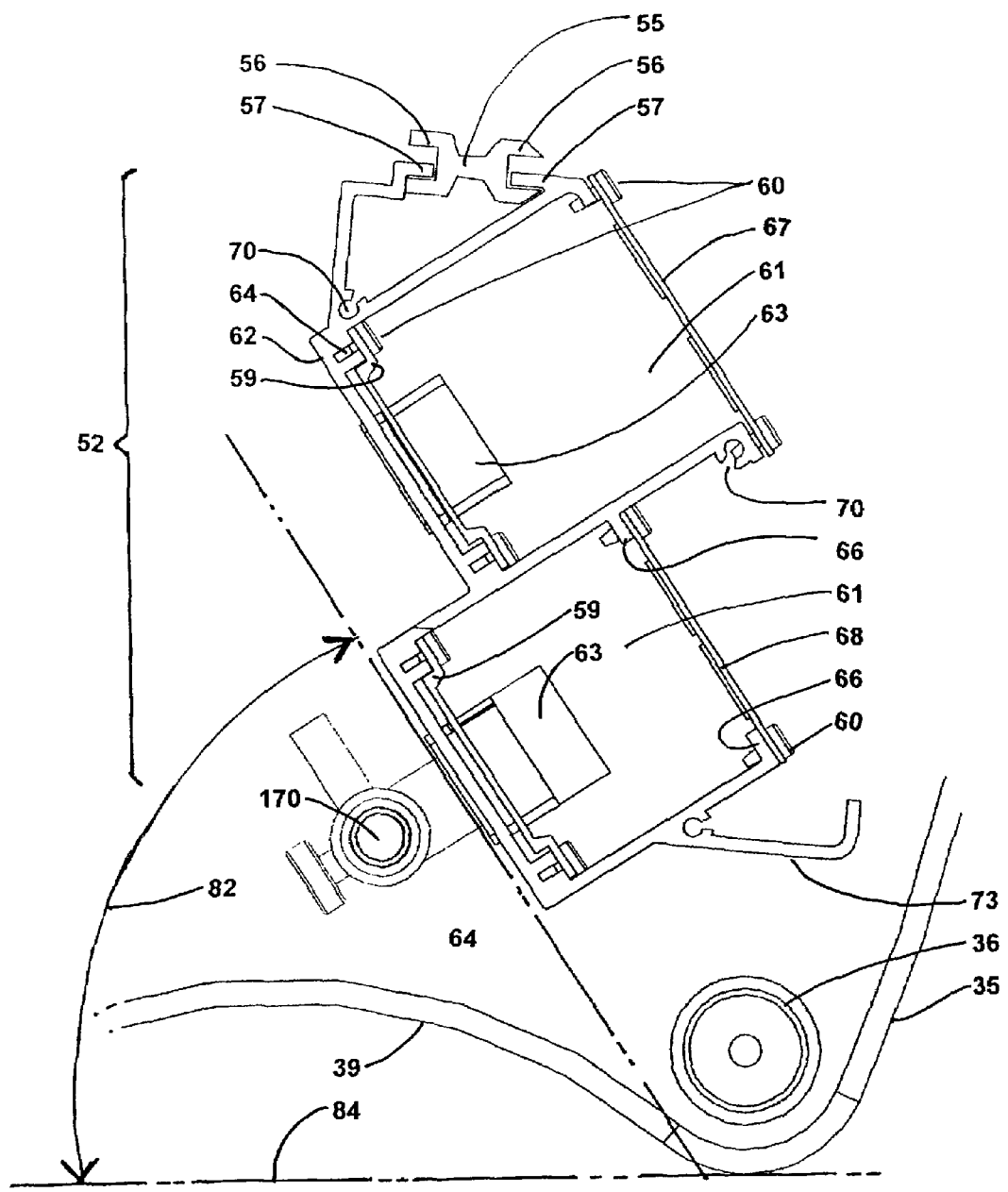
FIG. 9 shows a top view of a base module.

As shown in FIG. 9, each base module 52 in this embodiment is made from extruded aluminum and is comprised of separate wiring channels 61 in which utility service lines 165 are contained and concealed, and corresponding outlet surfaces 62 through which the corresponding outlets 63 project. Two base modules 52 are joined together into symmetrical cores 51 by fasteners, such as a locking extrusion 55.

In this embodiment, the clamping flanges 56 of the locking extrusion 55 interdigitate with the locking flanges 57 on the base modules 52 to assure accurate alignment and provide clamping force. In this embodiment, there are two base modules 52 with a total of four wiring channels 61 in a core, though the number could vary. For example, alternative configurations that use only one wiring channel 61 per base module 52, use more wiring channels 61 per base module 52, or incorporate monolithic cores with several integral wiring channels, are within the scope of this invention. The wiring channels 61 are configured to present the utility outlets conveniently to a user at angles to the side-to-side axis 77.

The cores 51 are closed off with side panels 72, as shown in FIGS. 2, 3 and 7, that are typically made of aluminum, stainless steel, sheet steel, plastic sheet, fiberglass or laminate construction. Each side panel 72 is attached to a core 51, such as by mechanical fasteners, to enclose and protect the utility lines. As shown in FIGS. 1, 2 and 8, side panels 72 also may accommodate accessories, such as a nurse call module 177, accessory panels 169 such as bulletin boards, tack boards and white boards, or a fold-out writing shelf 171, or storage devices such as patient chart holders, hangers for catheters, organizers for notes, reference documents, papers and similar items used by medical personnel or patients' families.

Figure 13:
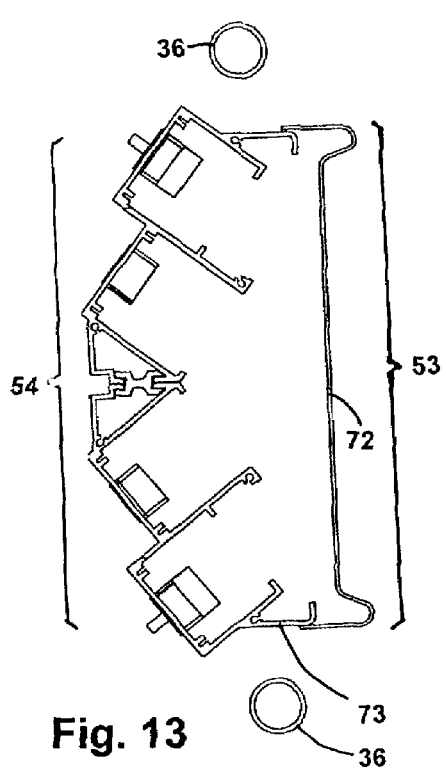
FIG. 13 shows a top view of a core assembly with fixed side panel.
Figure 14:
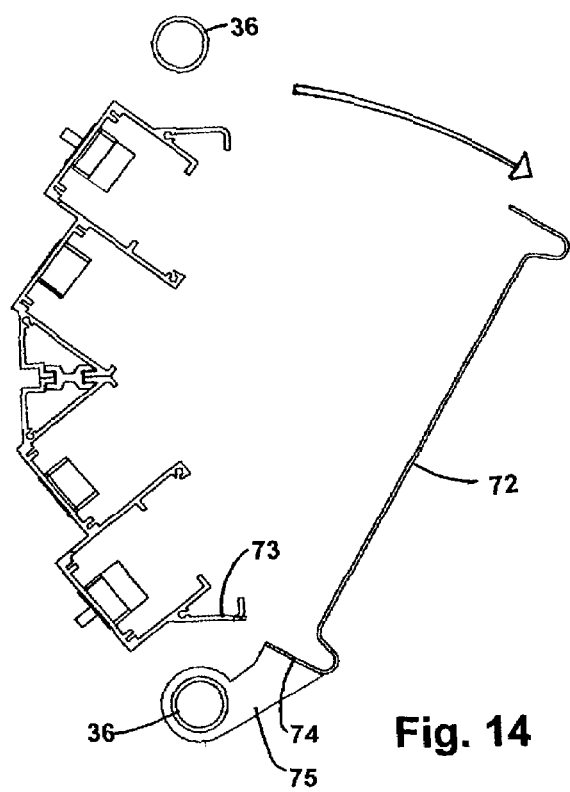
FIG. 14 shows a top view of a core assembly with hinged side panel.

As shown in FIG. 13, a side panel 72 may be attached to the closure flanges 73 of a fully assembled core. Optionally, as shown in FIG. 14, a side panel 72 also can be hinged using two hinge brackets 75 attached to the side flange 74 near the top and bottom of a side panel 72 to permit panel 72 to swing open like a door for easy access for servicing, repairs, or installation of additional outlets.

As shown in FIGS. 13, each core 51 has an outward face 53 defined by a side panel 72 and an inner surface 54, and the faces of outlets 63 which protrude through openings 58 cut into the outlet surfaces 62 of the cores 51, and inner surfaces 54 face each other across the open space 38 of the open medical system 30. The wiring channels 61 serve as distinct raceways that can be dedicated to a single utility category such as medical gases, emergency power or regular power without the need of additional separation of different types of utilities. As shown in FIG. 10, outlets 63 are installed into the wiring channels 61 from the inside into pre-punched openings 58 cut into the outlet surfaces 62 of each wiring channel 61 and attached such as by outlet holders 59 that are retained by fasteners such as mounting screws 60 inserted into threaded grooves 64 that extend inward from each wiring channel 61. If codes or ordinances require separation of adjacent outlets 63, a divider 65 can be installed by fastening it to the threaded grooves 64 and into the mounting flanges 66 as shown in FIGS. 9 and 10. The rear opening of each wiring channel 61 can be closed off by a full-length back plate 67 that is screwed to the mounting flanges 66 of each wiring channel 61. In cases where one or more outlets must be separated, smaller back plate modules 68 can be used. The back plates 67 and 68, as well as the dividers 65, have knock-out openings 69 to allow for traditional wiring options.

As shown in FIG. 4, the cores 51 are attached to the open medical system 30, such as by fasteners, such as self-tapping screws 47 inserted through recessed holes 48 in the outer surfaces 40 of the upper and lower plates, into screw receptacle grooves 70 that are extruded into the base modules 52. Optionally, a gasket 71 can be installed between plates 34, 35 and cores 51 to prevent unsanitary gaps and make the unit easier to clean.

The two opposing cores 51 contain, conceal and shield all utility service lines, such as cables, hoses, wiring, wiring devices and outlets. As shown in FIGS. 9 and 10, the outlet surfaces 62 of the cores 51 can by angled between 20 and 70 degrees against the frontal plane 84 of the open medical system 30 as indicated by arc 82. This orients the outlets 63 mounted to the cores 51 at an angle so they reach out to the user allowing more user friendly and ergonomic use. This angle prevents devices plugged directly into gas outlets such as flow meters 170 or blenders from projecting outside of the footprint of the open medical system 30. Footprint means the area defined by four planes that are parallel to the two axes 76 and 77 and tangent to the long edges 41 and the short edges 42 of the upper and lower plates 34, 35.

Unlike known systems, there are no horizontal structures for holding utility outlets. This leaves an open space 38, within the open medical system 30 between the two opposing cores 51 and the upper plate and lower plate, free of any permanent structures, and gives the user broad discretion in deployment of equipment and accessories.

The main assembly 31 should be positioned within easy reach of the user. The main assembly 31 may be supported at the proper level by a support such as a base assembly 90 that provides stability and, optionally, rotation about its vertical axis. As shown in FIGS. 15 and 16, one embodiment of the base assembly 90 consists of an outer base 91 that can be firmly attached to the floor and leveled as a permanent installation during rough-in installation by using several bolts 92 anchored in the floor through holes 93 in the base flange 94.

The base assembly can be fixed, or made to rotate. As shown in FIG. 15, using an axle 95 installed through two holes 96 placed in the lower portion of the outer base 91 at a right angle to the vertical axis of the outer base 91. External end caps 97 retain the axle in position. Internally to the outer base 91, two bearings 98 are attached in concentric and rotating relationship to the axle 95. Each bearing 98 is retained in close proximity to the inner wall 99 of the outer base 91, held in position by a snap ring, set screw, internal spacer or other device. Below the axle 95, an optional recessed box 100 allows installation of optional utilities, such as water and dialysate used in dialysis. A cover 101 covers the opening. The preferred embodiment of the outer base 91 is a tube. However, the outer base can be any shape, as long as a rotating element can be securely guided in it.

As shown in FIGS. 15 and 16, the main assembly 31 is aligned and secured to the outer base 91 to assure a coaxial, rotating relationship of the vertical axes of these components by means of an inner base 102 that extends coaxially into the center of the outer base 91. The outer surface 103 of the inner base 102 is fitted with a bearing means that reduces friction between it and the inner wall 99 of the outer base 91, and to prevent looseness in fit.

Bearing means include low-friction bumper strips 104 applied to the outer surface 103 of the inner base 102 as shown in FIG. 15, or any other type such as circumferential bearings or bushing rings made from low-friction plastic such as HDPE or Nylon, by ball bearings, or by any other, suitable method.

As shown in FIG. 15, the inner base 102 is firmly attached to the underside 40 of the lower plate 35 such as by means of bolts 105 attached through mounting lugs 106 extending from the mounting flange 107. The main assembly 31 can be positioned onto the anchored outer base 91 by lowering the inner base 102 into the outer base 91 until the undulating lower edge 108 of the inner base 102 comes to rest on the two bearings 98 located on the axle 95, a structure that permits the main assembly to rotate freely.

Users exert occasional tangential forces on the open medical system 30 such as when a connector is plugged into an outlet 63 or a pushbutton is pressed. As shown in FIGS. 15 and 16, an indexing detent mechanism in the base assembly 90 resists these forces, and reduces excessive rotation of the system from the forces. The detent mechanism includes an undulating lower edge 108 on the lower edge of the inner base 102 which, when rolling over the bearings 98 inside the outer base 91, causes slight movement of the main assembly 31 along its vertical axis. As a high spot 111 in the undulating lower edge 108 moves over the bearings 98, the entire open medical system 30 settles into a stable position. To rotate the open medical system, the user must exert enough tangential force by, for example, pushing on the vertical spacers 36 so that the next low spot 112 in the undulating lower edge 108 rolls across the bearing 98 and the unit settles into the next high spot 111. The frequency and depth of undulations 108, as well as the diameter of the bearings 98, can be adjusted to achieve any desired degree of resistance and rotational increments.

Alternatively, as shown in FIGS. 17, 18 and 19, instead of requiring a user to cause the entire main assembly 31 to shift vertically with each indexing motion, the full weight of the main assembly 31 can be supported by a bearing 114 attached to the upper end 116 of the outer base 91 such as by friction fit, mechanical fasteners or adhesive bonding. Specifically, the mounting flange 107 of the inner base 102 rests on the bearing 114 to provide smooth rotation of the main assembly 31 on the outer base 90 which reduces effort. The desired indexing can be provided by an indexing assembly 115, to upwardly bias the axle 95 that carries the bearings 98 so that the axle 95 deflects vertically inside of the vertical slots 117 in the outer base 91 to flexibly engage the undulations 108 on the lower edge of the inner base 102. The springs 118 are retained in proper engagement between the base flange 94 and the axle 95 by means of axle guide bushings 119. Concentricity guides 120 depend into the inner lumen of the springs 118 to keep coaxial alignment, and support flanges 121 act against the biasing force of the springs 118 to retain the springs 118 in general alignment with the axle 95 on which the bearings 98 are supported. The springs 118 urge the bearings upward and into rolling engagement with the undulation 108 to provide enough resistance between undulations 108 and bearings 98 for tactile and audible indexing.

For the open medical system 31 described herein, with upper and lower plates 34, 35 sized 18×32 inches, vertical spacers 36 of 56 inches length, and an outer base 91 of 14 inches diameter and 18 inches high, bearings 98 preferably have a diameter between 0.25 and 1 inch, the frequency of undulations 108 as measured between successive high spots 111 are preferably between 0.1 and 1 inch, and the amplitude, as measured between a tangent to the high spots 111 and a tangent to the low spots 112, are preferably between 0.25 and 1 inch.

Alternatively, as shown in FIG. 15, other profiles for indexing and complementary bearing diameters can be used to make indexing increments finer or coarser, and indexing resistance lighter or harder. In an alternative embodiment, the axle 95, with a diameter of between 0.38 and 0.75 inches, without the use of bearings 98, is in direct engagement with the undulations 108 of a frequency of between 0.38 and 0.75 inches, and an amplitude of 0.1 to 0.75 inches.

For open medical systems 30 that rotate, it is necessary to restrict the degree of rotation so that users cannot inadvertently twist or damage the utility service lines by excessively rotating the main assembly. The main assembly is preferably first installed in an orientation in which one long side is approximately parallel to the wall at the head of the bed or beds in the medical facility. Rotation preferably is limited to 180 degrees in each direction from this orientation upon installation. As shown in FIG. 15, one embodiment of the open medical system 30 incorporates a stop lug 109 attached to the upper edge 116 of the outer base 91, such as by fasteners or welding. At least one threaded stop pin 110, removably arrests rotation when it comes in contact with the stop lug 109. Stop pin 110 is attached, such as by threading it into tapped holes 113 in the mounting flange 107 that form a bolt circle around the inner base 102. By inserting a stop pin 110 on either side of the stop lug 109, the installer can determine the permitted scope of rotation and the end points of rotation. Optionally, one or two additional stop pins 110 can be permanently installed by the manufacturer, such as by welding, to prevent excessive rotation if the user accidentally omits to install the removable stop pins 110.

A rotating base provides a cost-effective method of providing the adjustability desired by care givers. However, a less costly embodiment uses a fixed and non-rotating base provided by attaching, such as with bolts or by welding, the mounting flange 107 directly to the outer base 91 and attaching the flange 107 to the lower side 40 of the lower plate 35 by bolts 105.

One advantage of the open medical system 30 is its recessed base assembly 90 that provides toe space to allow users to work close to the system and, due to the base assembly's small connection to the floor, facilitates cleaning of the floor.

Advantageously, the small footprint of the open medical system 30 also opens circulation space. As shown in FIGS. 1 and 15, the small footprint provides only a small connection area to the floor which can cause severe stress in the floor mounting bolts 92 by which the outer base 91 is anchored to the floor. To alleviate this stress, and to assist in keeping the open medical system 30 in proper vertical alignment over the base assembly 90 so it can rotate freely and is secure, the ceiling tube 122 can be secured to the ceiling structure by means of ceiling guide plate 126. This approach reduces the lateral loads on the base 91 while permitting the small footprint that is conducive to easy cleaning, good toe clearance for users, and unencumbered circulation space.

Using the ceiling guide plate 126 to secure the ceiling tube 122 of the open medical system 30 to the ceiling, in cooperation with a base assembly 90 that supports the full weight of the open medical system 30, the base structure can be as small as 1 inch in diameter. Thus, the ceiling guide plate 126 assures that the system 30 remains balanced vertically above the base assembly 90, and it provides resistance to lateral deflection caused by forces from accidental collisions with the open medical system 30, earthquakes, or other events. The ceiling guide plate 126 also improves the rotational characteristics of the open medical system 30 by keeping it vertically aligned and balanced above the base assembly 90. The ceiling guide plate 126 may be a panel made from a low-friction plastic sheet such as PVC, polyethylene or polypropylene, or other materials such as aluminum or steel, provided it has sufficient strength to resist lateral forces, and can be attached to the ceiling. The ceiling guide plate 126 is in rotational contact with the ceiling tube 122 but does not provide significant resistance to vertical movement of the ceiling tube 122, either during installation or use, including during rotation of the open medical system.

When the open medical systems 30 is being installed, the ceiling guide plate 126 generally may be anchored above, and in vertical axial alignment with, the base assembly 90 by either attaching the ceiling guide plate 126 to the suspended ceiling structure or to the ceiling and walls above the suspended ceiling using fasteners and angle brackets such as are typically used in plumbing and HVAC installations. A cut-out ceiling tile through which the ceiling tube 122 penetrates may be used to complete the installation.

Figure 5:
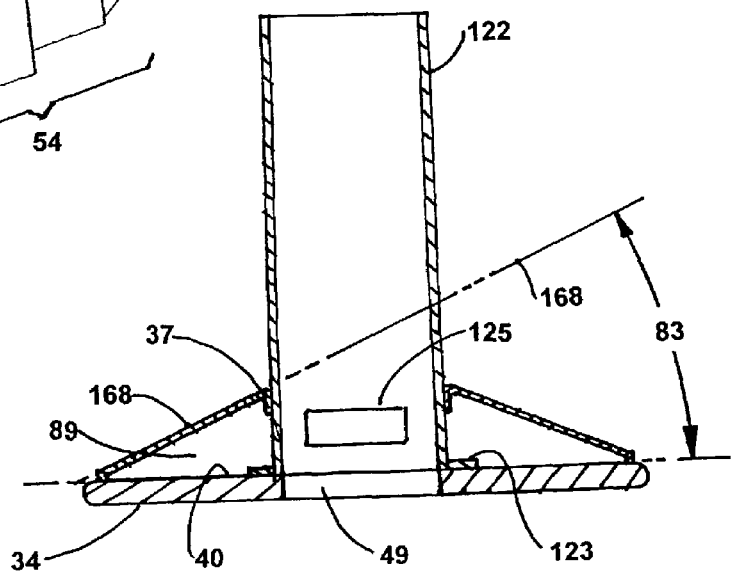
FIG. 5 is a section through the top cover and its sloped upper surfaces.

As shown in FIGS. 1 and 5, a top cover 37 is provided to close the open medical system above the upper plate. In accordance with hospital accreditation standards for horizontal equipment surfaces above eye level, the top surface 168 of the top cover 37 is slanted at an angle 83 between 5 and 60 degrees relative to the outer surface 40 of the upper plate 34, to minimize dust accumulating on the main assembly and to make it easier to clean than a flat upper plate. The slanted top surface 168 creates a space 89 between the top cover 37 and the outer surface 40 of the upper plate 34, which can be used to route utility supply lines.

The top cover 37 generally follows the perimeter of the upper plate 34, and preferably is made from flame resistant, pressure-formed sheet plastic, but can be made using many alternative materials and manufacturing processes, including metal fabrication or fiberglass lay-up.

Utilities are routed into the open medical system via a utility connection 32, which is a structure through which connections to utilities reach the main assembly. As shown in FIGS. 2 and 6, the top cover 37 and ceiling tube 122 is one embodiment of a utility connection 32 which encloses the utility lines that run from the ceiling through the ceiling tube 122 to the cores 51. The top cover 37 rests on the upper plate 34 in its down position and may be secured to the ceiling tube 122 so that it can be slid up along the ceiling tube to reveal the wiring feed holes 125 in the lower portion of the ceiling tube 122 and feed holes 49 and 50 in the upper plate 34 through which an installer can connect the unit to utilities. The top cover 37 also serves to conceal fasteners such as nuts 45 and screws 47.

An alternative utility connection 32 uses transoms 127, 128 to supplement the top cover 37 in routing utility service lines 165 from the ceiling to the cores 51. As shown in FIGS. 2 and 6, the utility service lines 165 may be pulled down through the ceiling tube 122 to exit on the bottom side of upper plate 34. Utility service lines, such as wires and hoses, that are not fished sideways through feed holes 125 but travel through the upper plate 34, may be contained in an upper transom 127 that distributes the utility service lines to the two cores 51. Alternatively, there also can be a lower transom 128, through which auxiliary wiring can be fed along the lower plate 35 between cores.

Transoms 127, 128 preferably are rigid, flat, elongated sheet metal structures interconnecting the cores 51. The transoms are open toward, and are attached to, the upper and lower plates 34, 35, such as by transom vertical sidewalls having flanges 129 through which the transoms are screwed to the upper or lower plates 34 and 35 respectively. The transoms 127, 128 can also be attached to upper and lower plates 34, 35 by welding or any other suitable means. The transoms 127, 128 can be provided with covered access openings 130 to facilitate connection of the main assembly 31. The transoms also add rigidity to the upper and lower plates.

As shown in FIG. 20, both the connection 32 and the support 33 also can be located exclusively above the open medical system, as shown in configurations 85 and 86, using any of several commercially available, known articulated arms or swiveling ceiling supports such as are commonly installed for supporting x-ray equipment, anesthesia machines and operating room lights. These known devices typically are structurally mounted to the hospital room ceiling or ceiling support structure, and can range from rigid, non-rotating drop tubes or rotating drop tubes, to articulated arms that permit the open medical system 30 to move freely about the room. Further, as shown in configurations 85 and 86 in FIG. 20, the utility connection 32 and the support 33 can be combined in a single structure 88.

Figure 21:
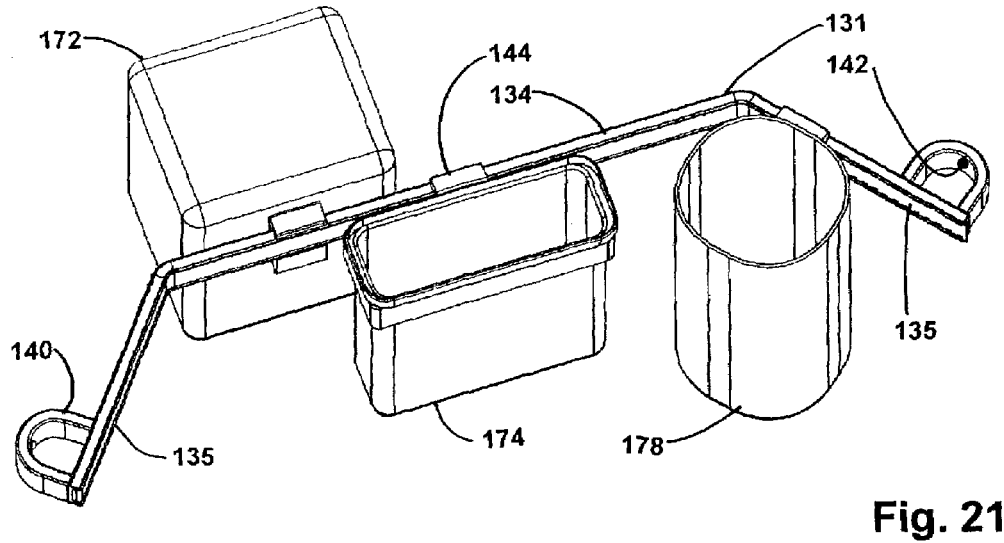
FIG. 21 shows a perspective view of contoured equipment rail with exemplary accessories attached.
Figure 23:
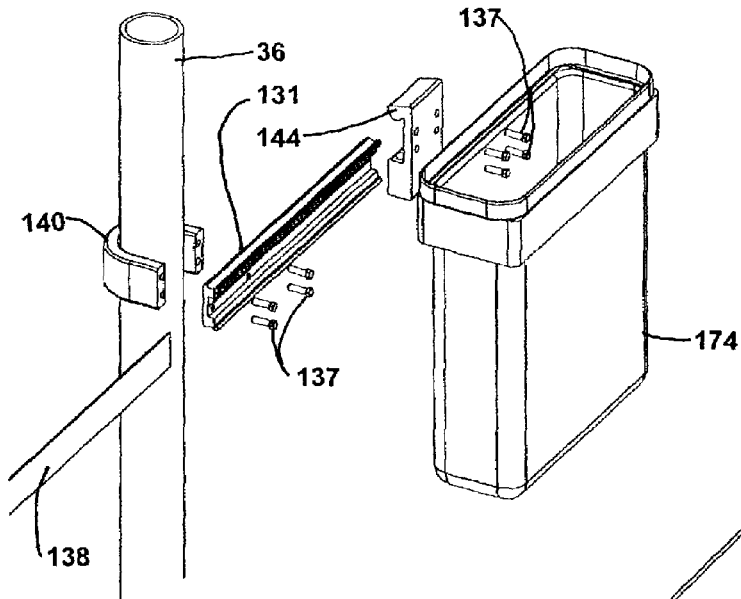
FIG. 23 shows an exploded view of accessory clip-on adapter and mounting detail of a contoured equipment rail to a vertical spacer.
Figure 24:
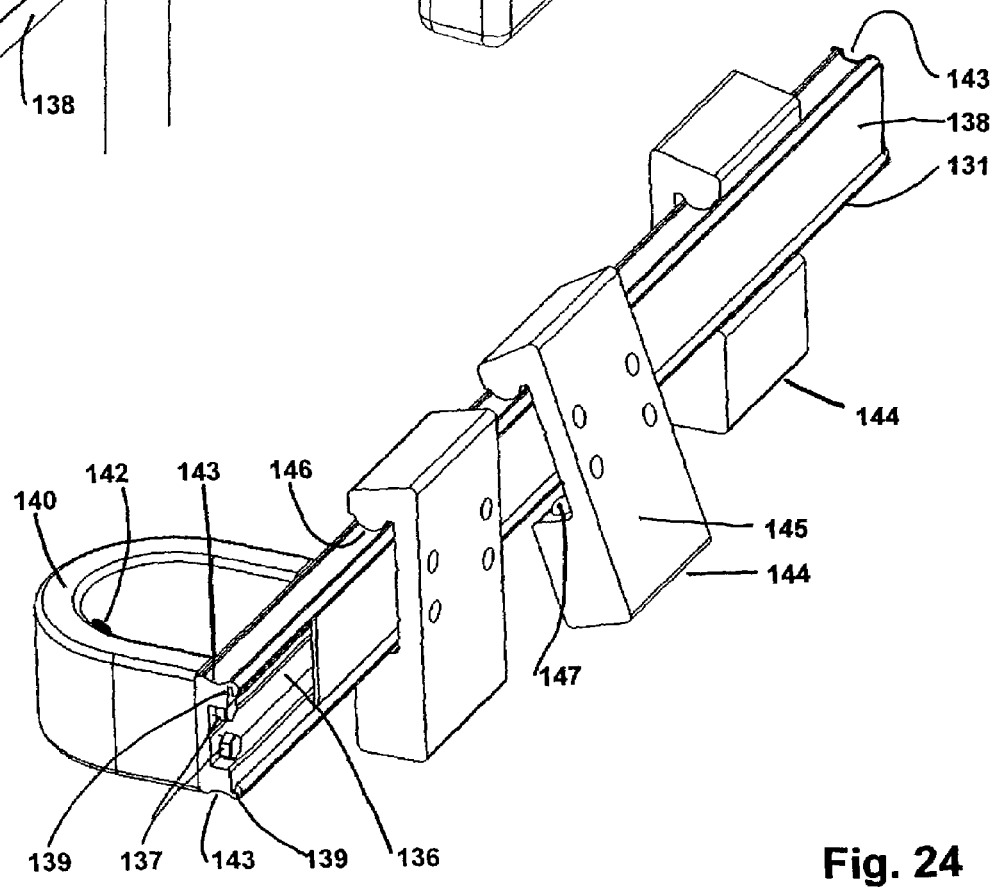
FIG. 24 shows a perspective view of a contoured equipment rail and accessory adaptor clips.
Figure 25:
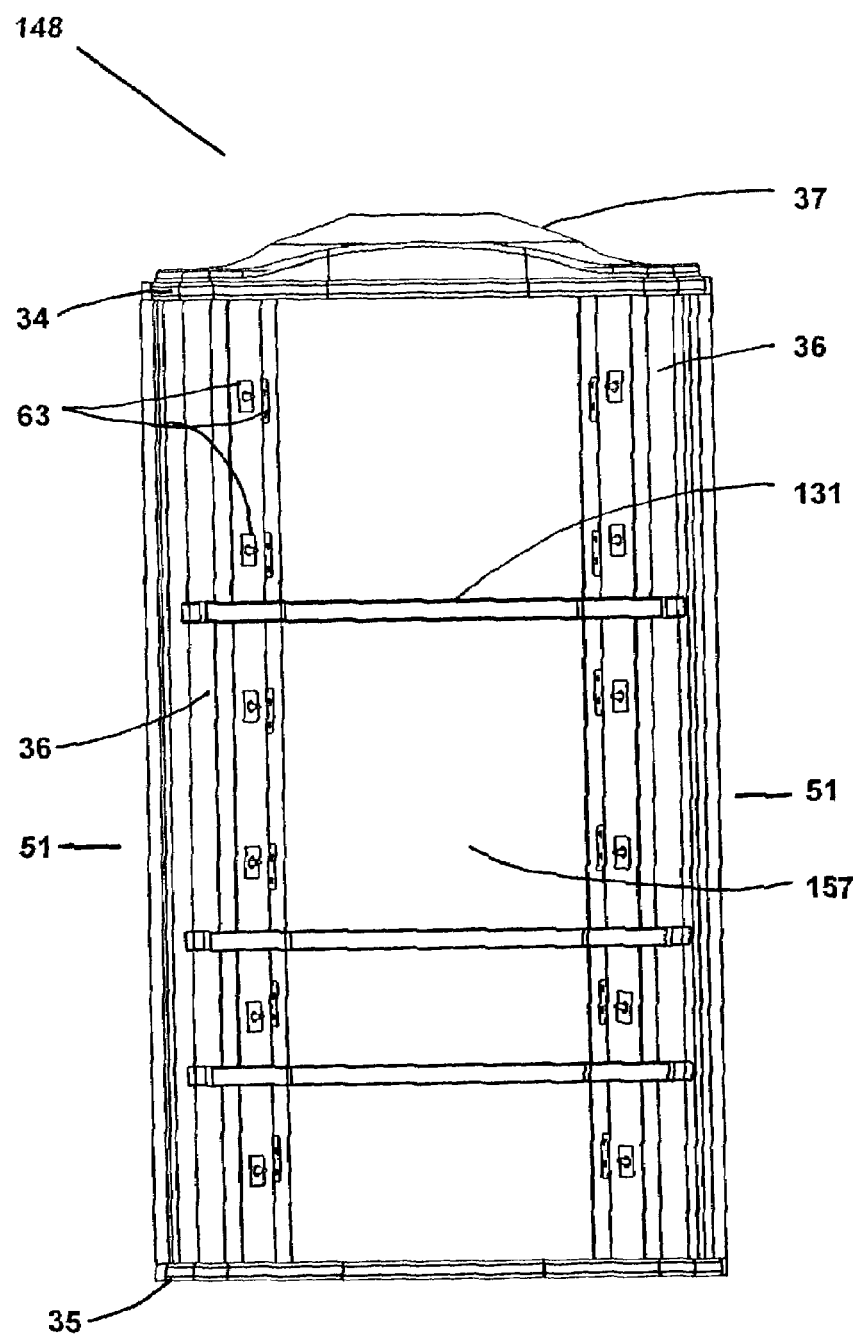
FIG. 25 shows a front elevation of wall mounted version.

As shown in FIG. 1, an advantage of the open medical system 30 is the unencumbered open space 38 between-the two cores 51 that minimizes visual obstruction in the patient room and allows users to arrange their equipment with fewer constraints. Equipment can be attached to contoured equipment rails 131 that a user can movably attach to the vertical spacers 36, as shown in FIGS. 21, 23 and 24.

Several elements permit care givers to use this open space 38 to meet the individual, changing requirements of their care giving tasks. The contoured equipment rails 131 can be attached by the user to the vertical spacers 36 at any desired level, and serve to accept a wide variety of medical devices 172, storage devices and accessories. Medical devices may include devices such as patient monitors, sphygmomanometers, pressure transducers, and other items used in intensive care. Storage devices may include devices such as organizers for supplies, storage baskets 176, storage trays, waste containers 178, and suctioning bottles 173. Accessories may include devices such as fold-out writing surfaces 171, marker boards, and panels to which patients' families can attach photographs and other personal items. Each of these devices may be fitted with a mating adapter clamp 144, as shown in FIGS. 21 through 24. Contoured equipment rails 131 are typically made from extruded aluminum or other metal.

The contoured equipment rail 131 may include a recessed groove 136 to accommodate the heads of mounting screws 137 by which it is attached to the rail mounting clamps 140. The fasteners 137 can be concealed by a facia strip 138 of sheet material such as colored melamine that is inserted between opposing facia grooves 139.

An advantage of the current invention is that the contoured equipment rail 131 can be contoured to follow the general shape of the cores 51. As shown in FIGS. 6, 7 and 21, contoured equipment rails with a straight rear segment 134 and two angled side segments 135 allow the rails 131 to hug the cores 51, and pieces of equipment and accessories fitted with adaptor clamps 144 will project into the open space 38 and ordinarily will not extend beyond the footprint of the overall unit 30, as in many known medical systems. This allows equipment to be attached anywhere along each flat stretch of a contoured equipment rail 131 by means of adapter clamps 144 and thus will accommodate most devices needed by care givers within the footprint of the open medical system 30.

Figure 11:
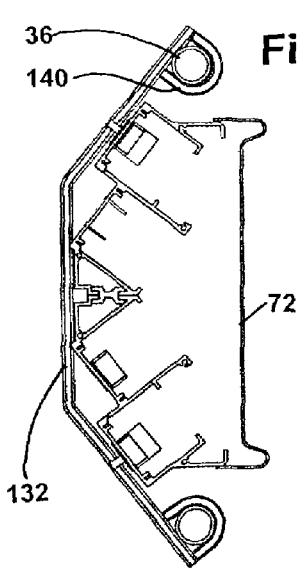
FIG. 11 shows a top view of a core using an alternative contoured inner equipment rail.
Figure 12:
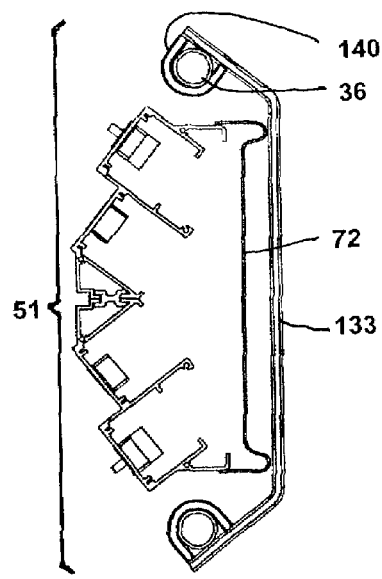
FIG. 12 shows a top view of a core using an alternative contoured outer equipment rail.

As shown in FIGS. 11 and 12, a variety of alternative contoured equipment rails can be used, such as a contoured inner equipment rail 132 that extends between two vertical spacers 36 along the entire inner surface 54 of a core 51 without crossing over to the other core, or a contoured outer equipment rail 133 that extends around the outward face 53 of the core 51 across a side panel 72 to provide additional attachment means for a user.

As shown in FIGS. 21, 23 and 24, rail mounting clamps 140 are provided at each end of a contoured equipment rail 131 to removably attach the contoured equipment rail to a pair of vertical spacers 36 by means of fasteners, such as screws 137, and positioning the contoured equipment rail 131 adjacent to the vertical posts 36 at the desired height. Rail mounting clamps 140 and cooperating contoured equipment rails 131 attach behind the vertical spacers 36 using screws 137 or other attachment means. A high-friction elastomeric bumper 142 is embedded in the inside of each rail mounting clamp 140 to provide controlled resistance when a clamp is set on a pair of vertical spacers 36 and to prevent the equipment rail from dislodging.

Contoured equipment rails 131 have opposing, radiussed upper and lower grooves 143, which are engaged by an adapter clamp 144 that has been attached to a piece of equipment or an accessory. As shown in FIG. 24, the adaptor clamp 144 is made to hang on the upper groove 143 of the contoured equipment rail 131 by means of an engagement nose 146. Equipment is attached on the upper groove 143 by placing the attached adaptor clamp 144 at a slight angle and then rotating it into a vertical operating position at which point a pair of spring loaded plungers 147 in the base segment 145 of the adapter clamp 144 engage the lower groove 143. Adapter clamps 144 can be attached to both sides of contoured equipment rails 131. In combination, this adapter clamp and contoured equipment rail mechanism will accommodate almost any medical devices, storage devise and accessory devices that have been fitted with an adapter clamp. These devices can be quickly positioned and repositioned by a user, which offers great flexibility.

The open medical system 30 can be adapted to various alternative configurations such as wall mounting due to its modular construction. FIGS. 25 through 28 show a wall mounted version 148 of the open medical system, having two horizontal plates, an upper plate 34 and a lower plate 35, vertical spacers 36 separating the plates, two cores 51, a utility connection 32 and a support 33. To adapt the open medical system for wall mounting, the open medical system 30 of FIGS. 1 and 8 has been halved along its vertical axis such that each core 51 is split in half and consists only of one base module 52 facing toward the room.

Figure 26:
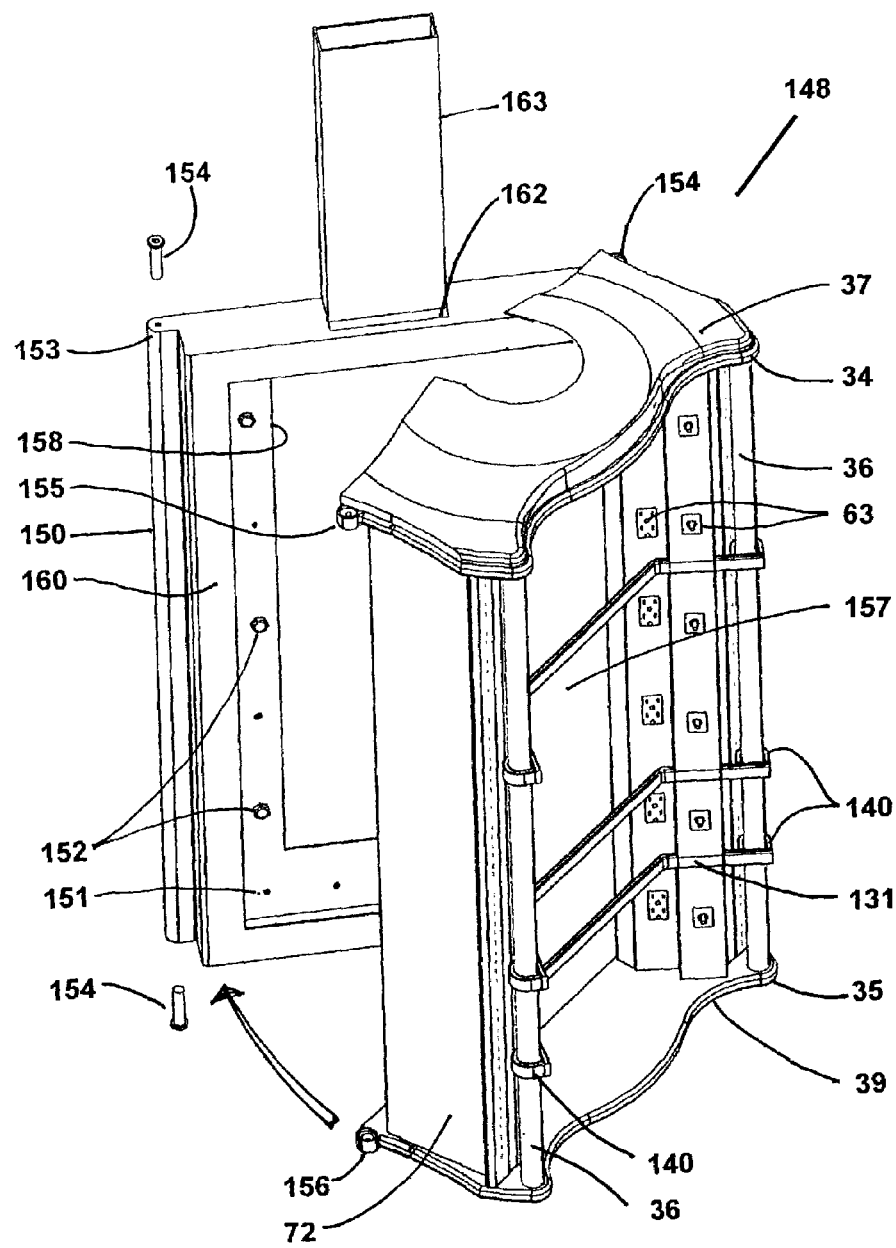
FIG. 26 shows an oblique frontal view of wall mounted version installed to wall mounting bracket.
Figure 27:
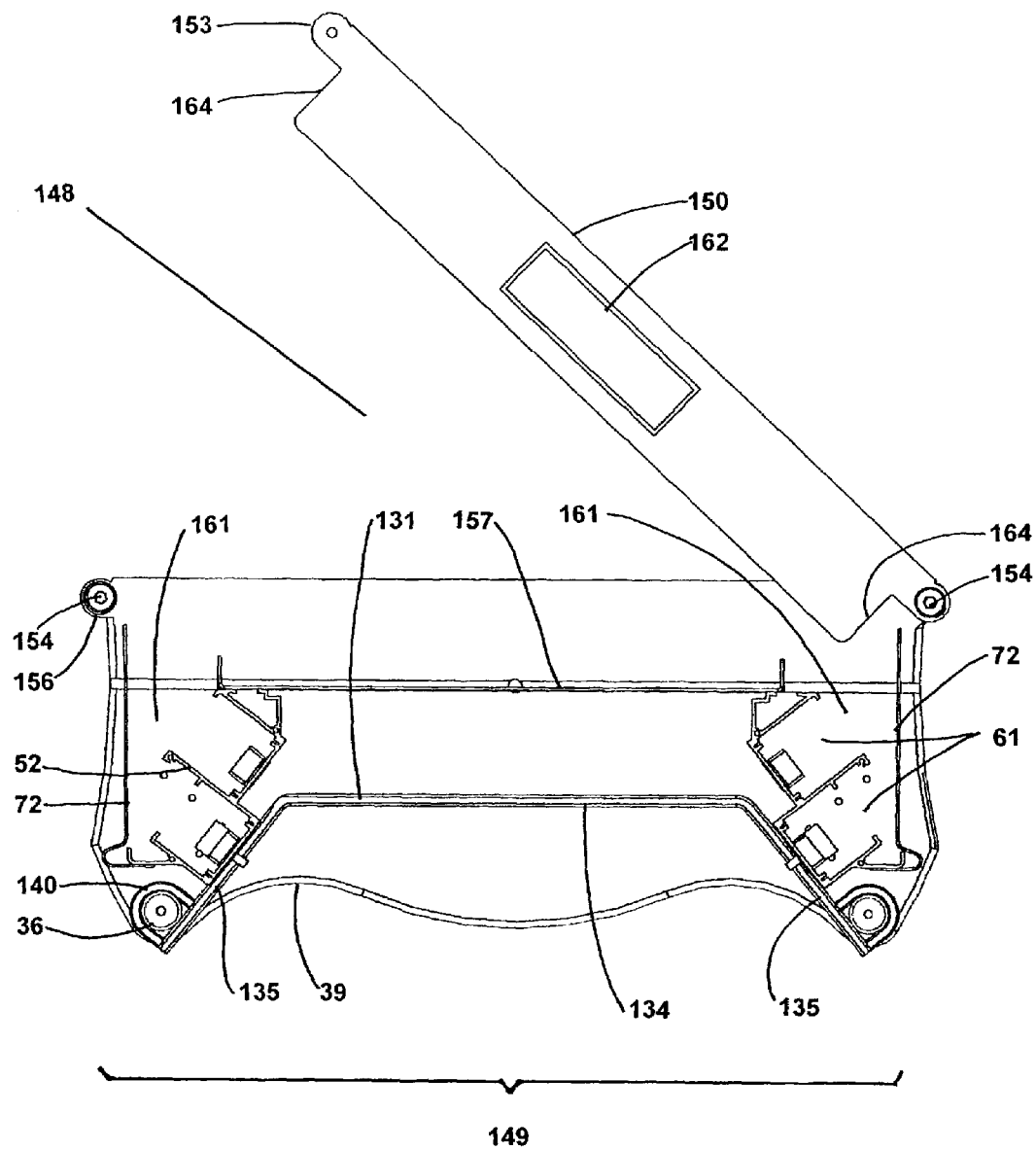
FIG. 27 shows a top-down perspective view into the wall mounted version with top panel and top cover removed.
Figure 28:
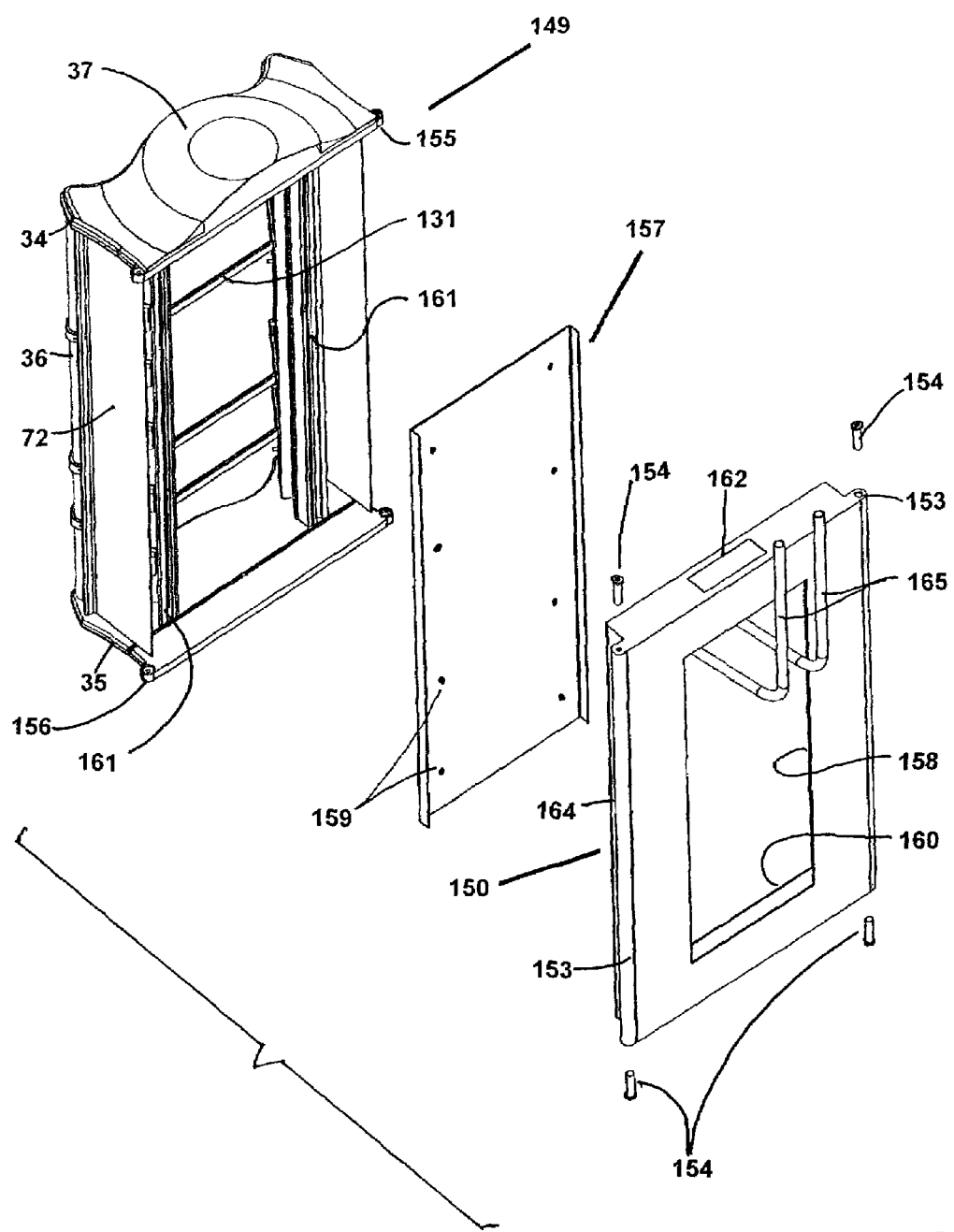
FIG. 28 shows an oblique rear exploded view of wall mounted version.

Wall mounting allows utility service lines 165 to be supplied through the wall to the wall mounting bracket 150. Thus, as shown in FIGS. 26 and 27, in the wall mounted version 148, utility service lines 165 enter the wall mounting bracket 150 either through its mounting point on the wall or through an external wall chase 163 and associated wiring access plate 162 in wall mounting bracket 150, combining the utility connection 32 and the support 33. In the wall mounted version 148, the support 33 is a wall mounting bracket 150 that permits an installer to rough in the utility connections and finish the rough, structural installation before the delicate main wall module 149 is set in place and connected. The wall mounting bracket 150 can be similar in construction to a typical breaker panel that will enclose all wiring and connections. The wall mounting bracket 150 has two lateral extensions 153 that accommodate a pivoting mechanism and fastening means.

After the wall mounting bracket 150 has been installed, the main wall module 149 is anchored to the wall mounting bracket by means of hinge pins, such as two removable locking bolts 154 that are installed through upper and lower mounting lugs 155 and 156 in the main wall module 149. Once secured in this manner, the main wall module 149 is connected to the utilities in wiring areas 161. Later, when the wall mounted version 148 is serviced or repaired, or when additional outlets are installed in the field, the main wall module 149 can be pivoted on its locking bots 154 that serve as hinge pins, to facilitate access. As shown in FIGS. 26 and 27, the installation may be completed by rotating the main wall module 149 into position against the wall mounting bracket 150 and securing it by locking bolts 154 that may be inserted through the upper and lower mounting lugs 155 and 156 into corresponding holes in the lateral extensions 153 in the wall mounting bracket 150. A back panel 157 can be attached to the inside of the main wall module 149 to close the central opening and prevent care giver access to the inside of the wall mounting bracket where the utility service lines are connected.

The wall mounted version 148 has side panels 72 that are attached to the closure flanges 73 of the cores 51 and overlap, and are supported by, the side surfaces 164 of the wall mounting bracket 150 when the wall mounted version 148 is closed and in operation.

Figure 22:
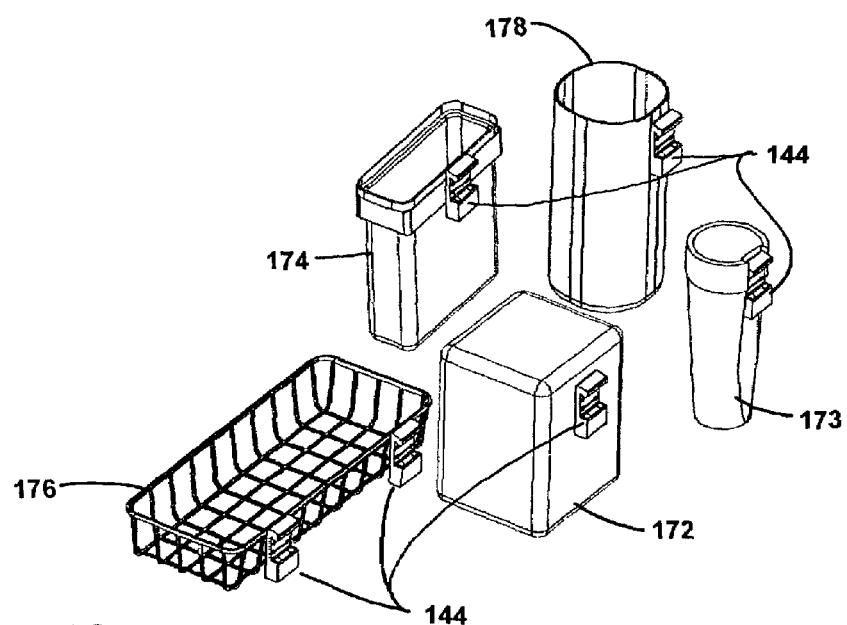
FIG. 22 shows several stylized accessories that might be attached by a user to contoured equipment rails.

The wall mounted version 148 has vertical spacers 36 on which contoured mounting rails 131 may be attached by means of rail mounting clamps 140. Patient support equipment and accessories, such as shown in FIG. 22, may be fitted with rail adaptor clamps 144 to be used in the wall mounted version 148. Modularization and standardization of contoured equipment rails 131 and adapter clamps 144 allows the sharing of equipment resources among a hospital's different care units and patient rooms that use open medical systems 30 in free-standing, wall mounted or ceiling supported versions, contributing to improved equipment utilization rates and resulting savings.

We claim:

1. An open medical system for deploying, supporting and organizing medical equipment and medical utilities, comprising:
   a main assembly having an upper plate and a lower plate held in fixed spaced apart relation by a plurality of spacers, two cores of trapezoidal shape located between the upper plate and lower plate and between said spacers, with each core having at least one utility channel and at least one one outlet, and;

a utility connection for connecting utilities to the main assembly, wherein each core is comprised of two identical base modules, each base module having two channels, and wherein each core has an outward face, an inward face, and at least one outlet on the inward face.

2. The open medical system of claim 1 in which the two base modules comprising a core are joined by a locking extrusion.

3. The open medical system of claim 2 in which the locking extrusion has clamping flanges, each base module has a locking flange, and the locking extrusion forms the base modules by interdigitating the clamping flanges with the locking flanges.

4. The open medical system of claim 3 in which the system has a frontal plane, and outlet surfaces are angled in relation to the frontal plane.

5. The open medical system of claim 1 in which there are two opposing cores, and the outlets are arranged vertically and face an open space in the system defined by the upper plate, the lower plate and the inward faces of the two opposing cores.

6. The open medical system of claim 5 in which the angle of each outlet surface is between 20 and 70 degrees, as measured in relation to the frontal plane.

7. The open medical system of claim 5 having a side panel covering the outward face.

8. The open medical system of claim 7 in which the side panel is hinged to open and close.

9. The open medical system of claim 8 in which there is at least one accessory attached to a side panel.

10. An open medical system for deploying, supporting and organizing medical equipment and medical utilities, comprising:
  a main assembly having an upper plate and a lower plate held in fixed spaced apart relation by a plurality of spacers, and at least one core located between the upper plate and lower plate, with each core having at least one channel and one outlet;
  a utility connection for connecting utilities to the main assembly; and
  a support for supporting the main assembly in a medical facility,
  said support allowing the system to rotate and having an indexing means which incrementally resets the free rotation of the main assembly, and
  wherein said support has an inner base with undulations, and an outer base, and the indexing means is a stationary bearing rigidly attached to the outer base, and the undulations biased into rolling engagement with the bearing by gravity.

11. An open medical system for deploying, supporting and organizing medical equipment and medical utilities, comprising:
  a main assembly having an upper plate and a lower plate held in fixed spaced apart relation by a plurality of spacers, and at least one core located between the upper plate and lower plate, with each core having at least one channel and one outlet;
  a utility connection for connecting utilities to the main assembly; and
  a support for supporting the main assembly in a medical facility,
  said support allowing the system to rotate and having an indexing means which incrementally resets the free rotation of the main assembly, and
  wherein the indexing means has an inner base having undulations, an outer base, and an axle, so that the axle is attached to the outer base and the inner base undulations rest on the axle.

12. An open medical system for deploying, supporting and organizing medical equipment and medical utilities, comprising:
  a main assembly having an upper plate and a lower plate held in fixed spaced apart relation by a plurality of spacers, and at least one core located between the upper plate and lower plate, with each core having at least one channel and one outlet;
  a utility connection for connecting utilities to the main assembly; and
  a support for supporting the main assembly in a medical facility, said support allowing the system to rotate, and
  wherein said support has an inner base and an outer base, and the outer base is attached to the medical facility at a point below the lower plate, the outer base has two holes, and an axle and at least one bearing is installed in the outer base to permit the inner base to rotate inside the outer base.

13. An open medical system for deploying, supporting and organizing medical equipment and medical utilities, comprising:
  a main assembly having an upper plate and a lower plate held in fixed spaced apart relation by a plurality of spacers, and at least one core located between the upper plate and lower plate, with each core having at least one channel and one outlet;
  a utility connection for connecting utilities to the main assembly; and
  a support for supporting the main assembly in a medical facility wherein the support includes a base assembly attached to the lower plate, and further wherein the support includes a ceiling plate and a ceiling tube connecting the ceiling plate and main assembly.

14. An open medical system for deploying, supporting and organizing medical equipment and medical utilities, comprising:
  a main assembly having an upper plate and a lower plate held in fixed spaced apart relation by a plurality of spacers, and at least one core located between the upper plate and lower plate, with each core having at least one channel and one outlet;
  a utility connection for connecting utilities to the main assembly; and
  a support for supporting the main assembly in a medical facility wherein the support includes a base assembly attached to the lower plate, and further wherein the support is an articulating arm having two ends, one end of which is attached to the main assembly and the other end of which is attached to the medical facility at a point above the upper plate.

15. An open medical system for deploying, supporting and organizing medical equipment and medical utilities, comprising:
  a main assembly having an upper plate and a lower plate held in fixed spaced apart relation by a plurality of spacers, and at least one core located between the upper plate and lower plate, with each core having at least one channel and one outlet;
  a utility connection for connecting utilities to the main assembly; and
  a top cover attached to the upper plate, wherein the system is located in a medical facility, a ceiling tube connects the main assembly to the medical facility, and the top cover is mounted concentrically around the ceiling tube.

16. An open medical system for deploying, supporting and organizing medical equipment and medical utilities, comprising:
   a main assembly having an upper plate and a lower plate held in fixed spaced apart relation by a plurality of spacers, and two cores located between the upper plate and lower plate, with each core being comprised of two substantially identical base modules, each base module having two channels and each core having at least one utility channel and one outlet; and
   a utility connection for connecting utilities to the main assembly.

17. The open medical system of claim 16 in which the two base modules comprising a core are joined by a locking extrusion.

18. The open medical system of claim 17 in which the locking extrusion has clamping flanges, each base module has a locking flange, and the locking extrusion forms the base modules by interdigitating the clamping flanges with the locking flanges.

19. The open medical system of claim 18 in which the system has a frontal plane, and outlet surfaces are angled in relation to the frontal plane.

20. The open medical system of claim 16 in which the two cores are opposing, each core having an outward face and an inward face, and the outlets are arranged vertically and face an open space in the system defined by the upper plate, the lower plate and the inward faces of the two opposing cores.

21. The open medical system of claim 20 in which the angle of each outlet surface is between 20 and 70 degrees, as measured in relation to the frontal plane.

22. The open medical system of claim 20 having a side panel covering the outward face.

23. The open medical system of claim 22 in which the side panel is hinged to open and close.

24. The open medical system of claim 23 in which there is at least one accessory attached to a side panel.

25. An open medical system for deploying, supporting and organizing medical equipment and medical utilities, comprising:
   a main assembly having an upper plate and a lower plate held in fixed spaced apart relation by a plurality of spacers, and at least one core located between the upper plate and lower plate, with each core having at least one channel and one outlet;
   a utility connection for connecting utilities to the main assembly; and
   a support for supporting the system in a medical facility, the support comprising a base assembly which allows the system to rotate, the base assembly having an indexing means which incrementally resets the free rotation of the main assembly, and an inner base, a plurality of undulations on the inner base, an outer base, springs, an axle, and a bearing; and
   the indexing means is the axle-mounted bearing biased into rolling engagement with the undulations by the springs, and by which the undulations are in rolling engagement with the bearing such that indexing of successive undulations creates discrete intervals of resistance.

26. The open medical system of claim 25 in which the support includes a ceiling plate and a ceiling tube connecting the ceiling plate and main assembly.

27. An open medical system for deploying, supporting and organizing medical equipment and medical utilities, comprising:
   a main assembly having an upper plate and a lower plate held in fixed spaced apart relation by a plurality of spacers, and at least one core located between the upper plate and lower plate, with each core having at least one channel and one outlet;
   a utility connection for connecting utilities to the main assembly; and
   at least one movable contoured equipment rail, in which the contoured equipment rail has two ends, a straight rear segment and two angled segments, one on each end, such that the end of the contoured rail may be attached to a spacer, and the angled segments follow the general shape of the core closest to the angled segment on each end of the rail, and in which the system has a front-to-back axis and in which the contoured rail is attached at each end to, and extends between, two spacers aligned so that a line drawn between the two spacers would be approximately parallel to the front-to-back axis of the system.

28. An open medical system for deploying, supporting and organizing medical equipment and medical utilities, comprising:
   a main assembly having an upper plate and a lower plate held in fixed spaced apart relation by a plurality of spacers, and at least one core located between the upper plate and lower plate, with each core having at least one channel and one outlet;
   a utility connection for connecting utilities to the main assembly;
   at least one movable contoured equipment rail, in which the contoured equipment rail has two ends, a straight rear segment and two angled segments, one on each end, such that the end of the contoured rail may be attached to a spacer, and the angled segments follow the general shape of the core closest to the angled segment on each end of the rail, and in which the system has a side-to-side axis and in which the contoured rail is attached at each end to, and extends between, two spacers aligned so that a line drawn between the two spacers would be approximately parallel to the side-to-side axis of the system; and aligned so that a line drawn between the two spacers would be approximately parallel to the side-to-side axis of the system.

29. The open medical system of claim 28 having a rail mounting clamp for each end of the contoured equipment rail, each rail mounting clamp movably attachable to the spacer so that the majority of the rail mounting clamp lies between the side-to side axis of the system and a parallel line drawn through the center of the spacers to which the ends of the rail mounting clamps are attached.

30. The open medical system of claim 28 having a rail mounting clamp for each end of the contoured equipment rail, each rail mounting clamp movably attachable to the spacer.

31. The open medical system of claim 30 in which the rail mounting clamp attaches to the vertical spacer so that the majority of the rail mounting clamp lies between the front-to-back axis of the system and a parallel line drawn through the center of the spacers to which the ends of the rail mounting clamps are attached.

32. An open medical system for deploying, supporting and organizing medical equipment and medical utilities, comprising:

a main assembly having an upper plate and a lower plate held in fixed spaced apart relation by a plurality of spacers, and at least one core located between the upper plate and lower plate, with each core having at least one channel and one outlet, and;

a utility connection for connecting utilities to the main assembly; and a top cover is attached to the upper plate, in which the upper plate has an outer surface, and the top cover has a top surface, and in which the top surface is angled between 5 and 60 degrees relative to the outer surface.

33. The open medical system of claim 32 in which the system is located in a medical facility, a ceiling tube connects the main assembly to the medical facility, and the top cover is mounted concentrically around the ceiling tube.

* * * * *